INVENTOR.
ERWIN A. HAUCK

Feb. 23, 1971  E. A. HAUCK  3,566,364
DATA PROCESSOR HAVING OPERATOR FAMILY CONTROLLERS
Filed July 19, 1968  14 Sheets-Sheet 2
FIG. 3.
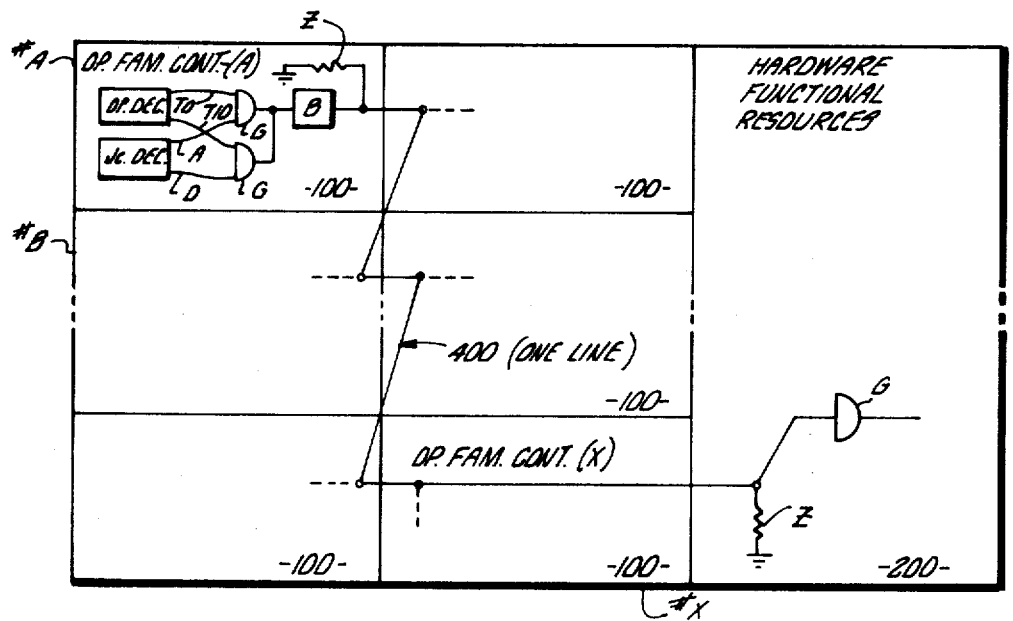
PRESENT INVENTION
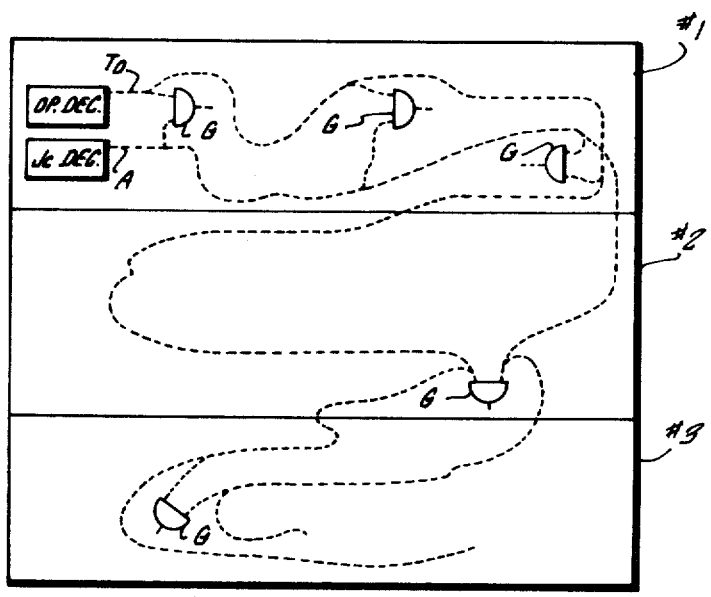
PRIOR ART
FIG. 2.

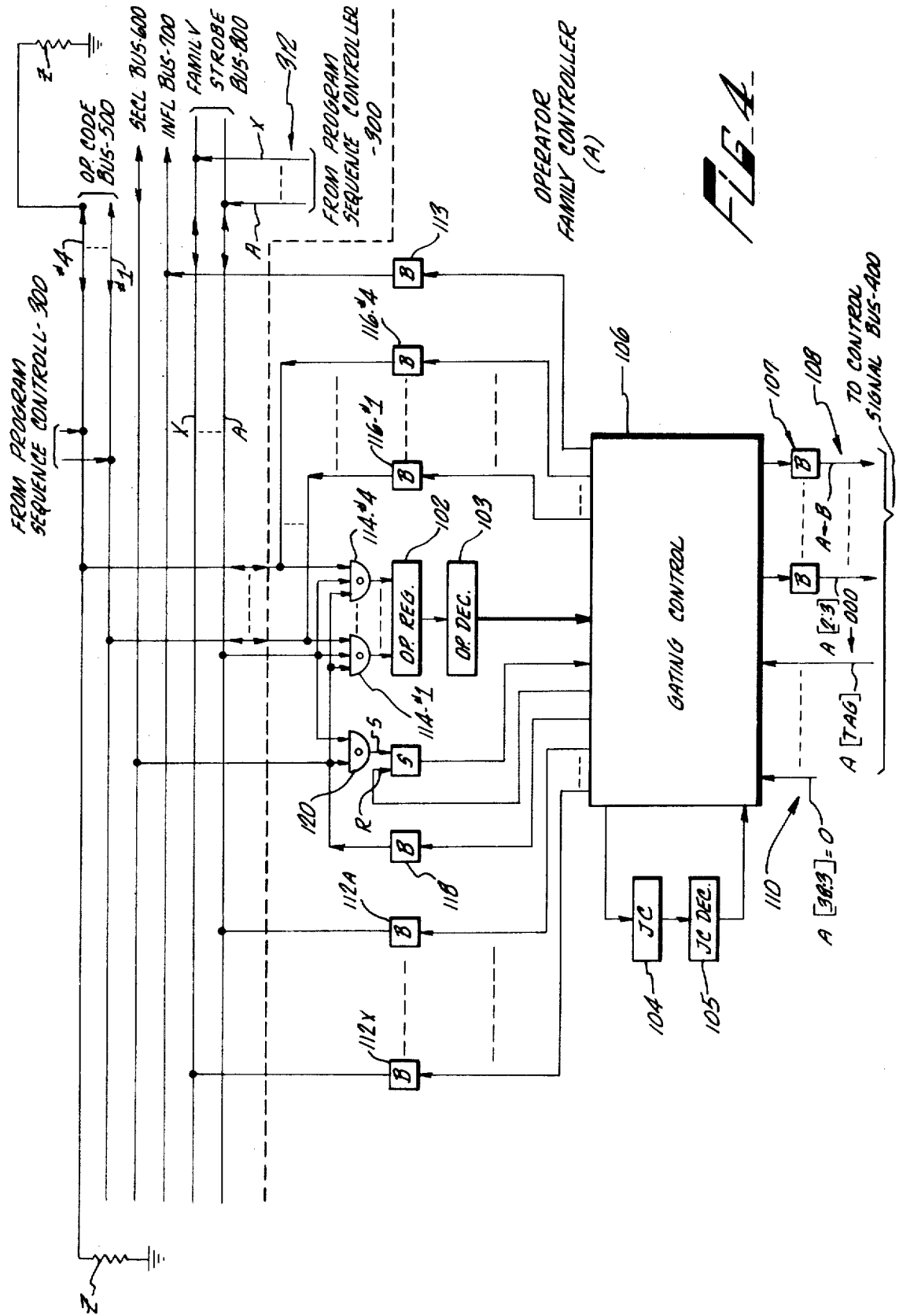

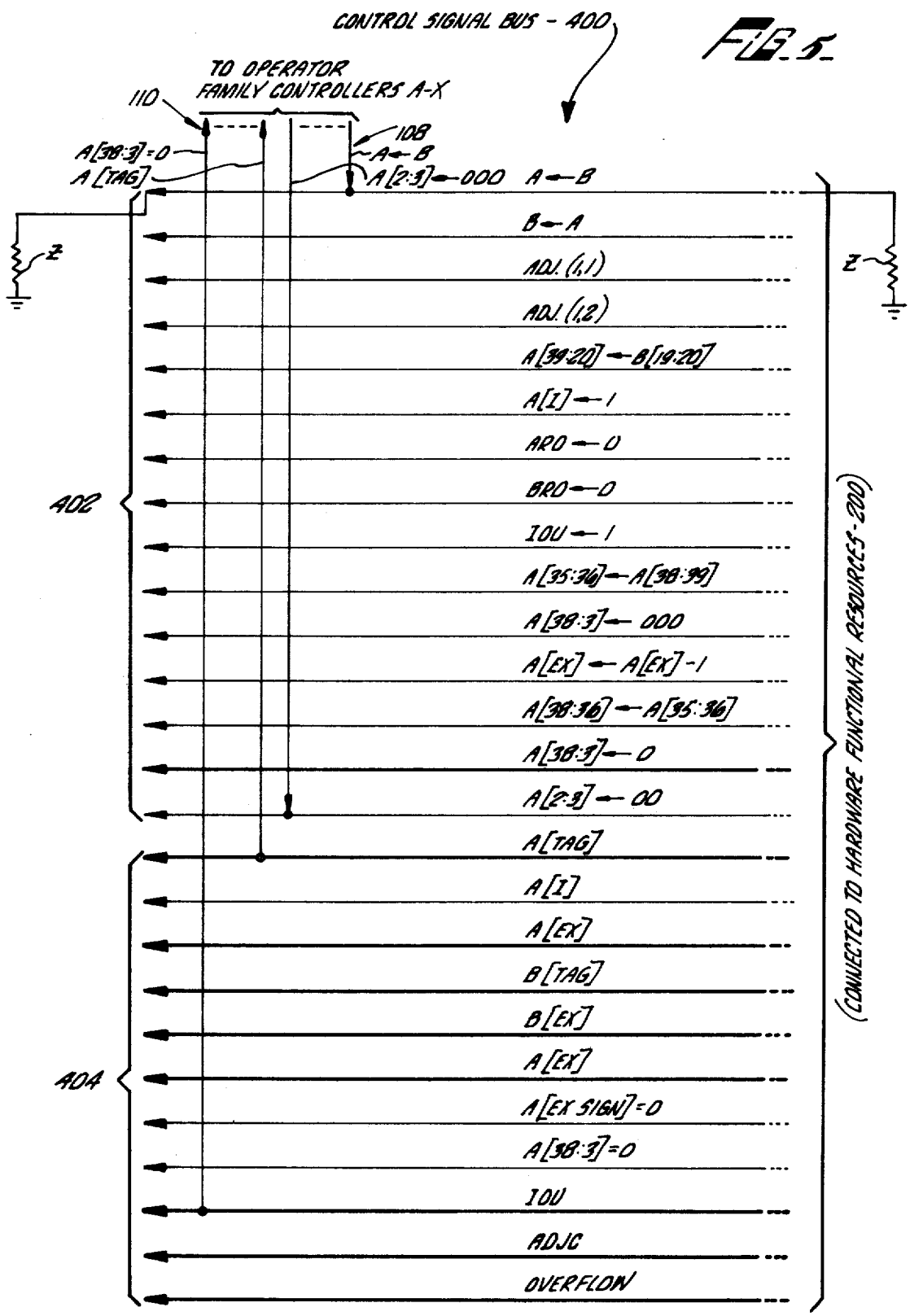

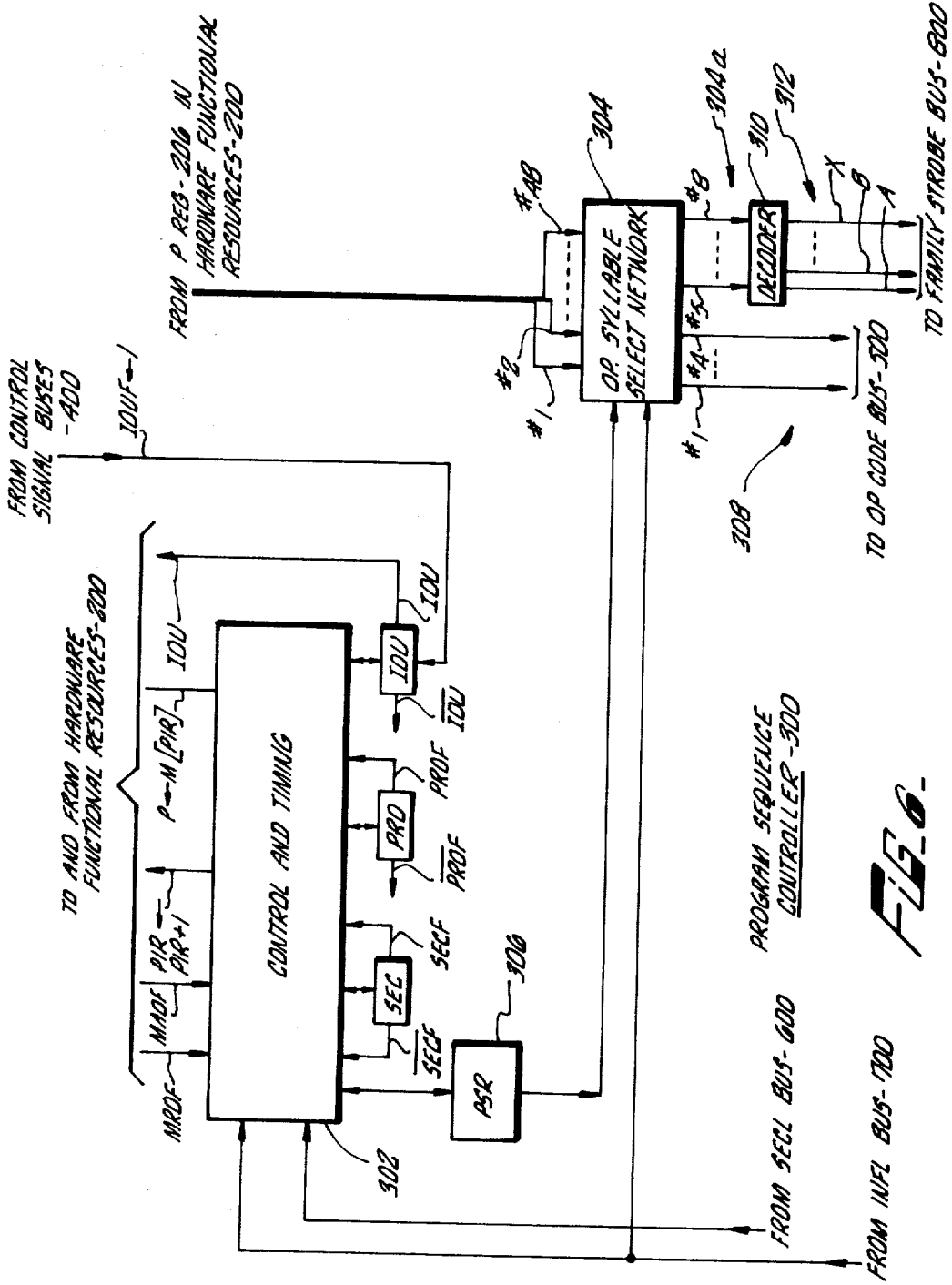

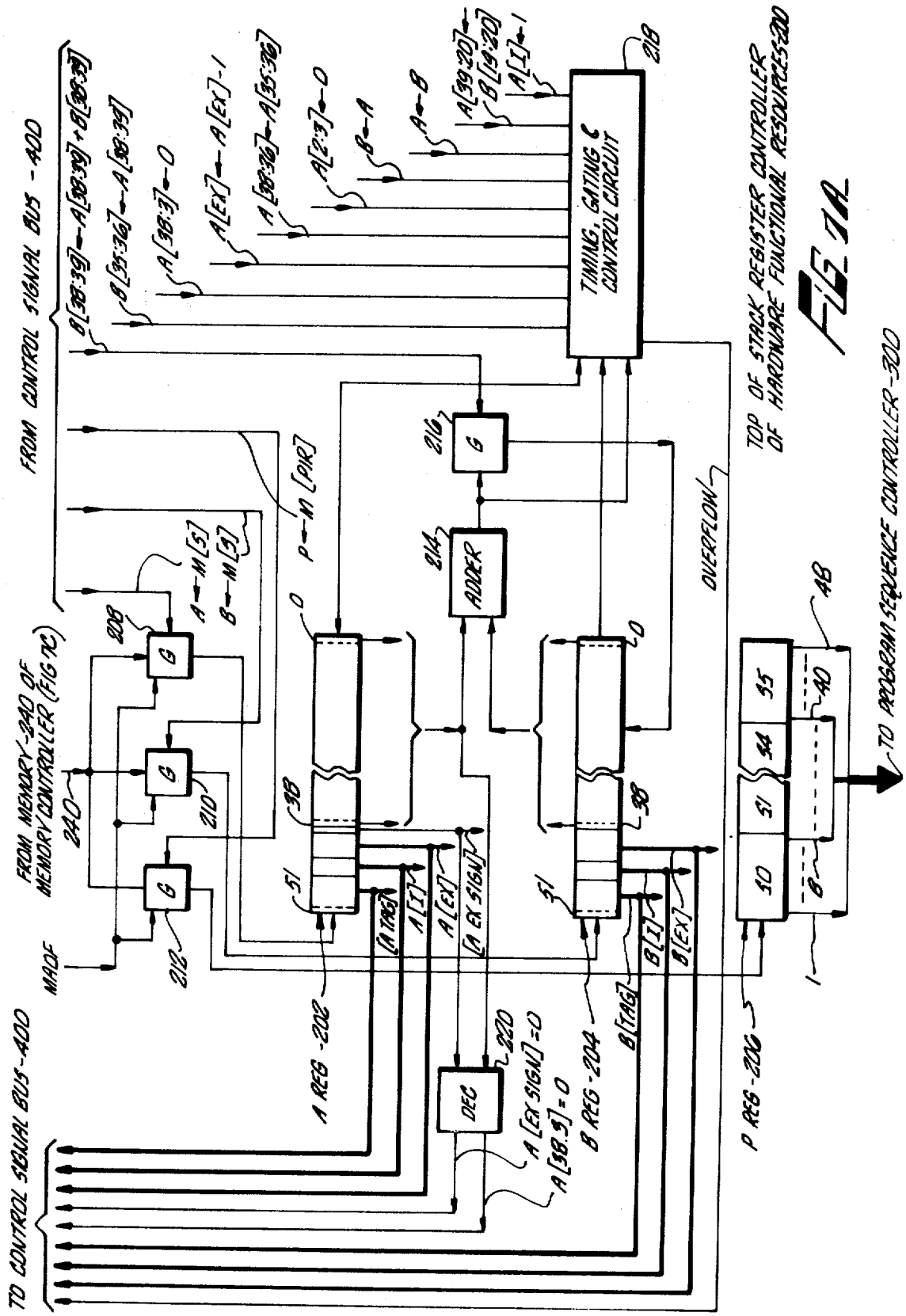

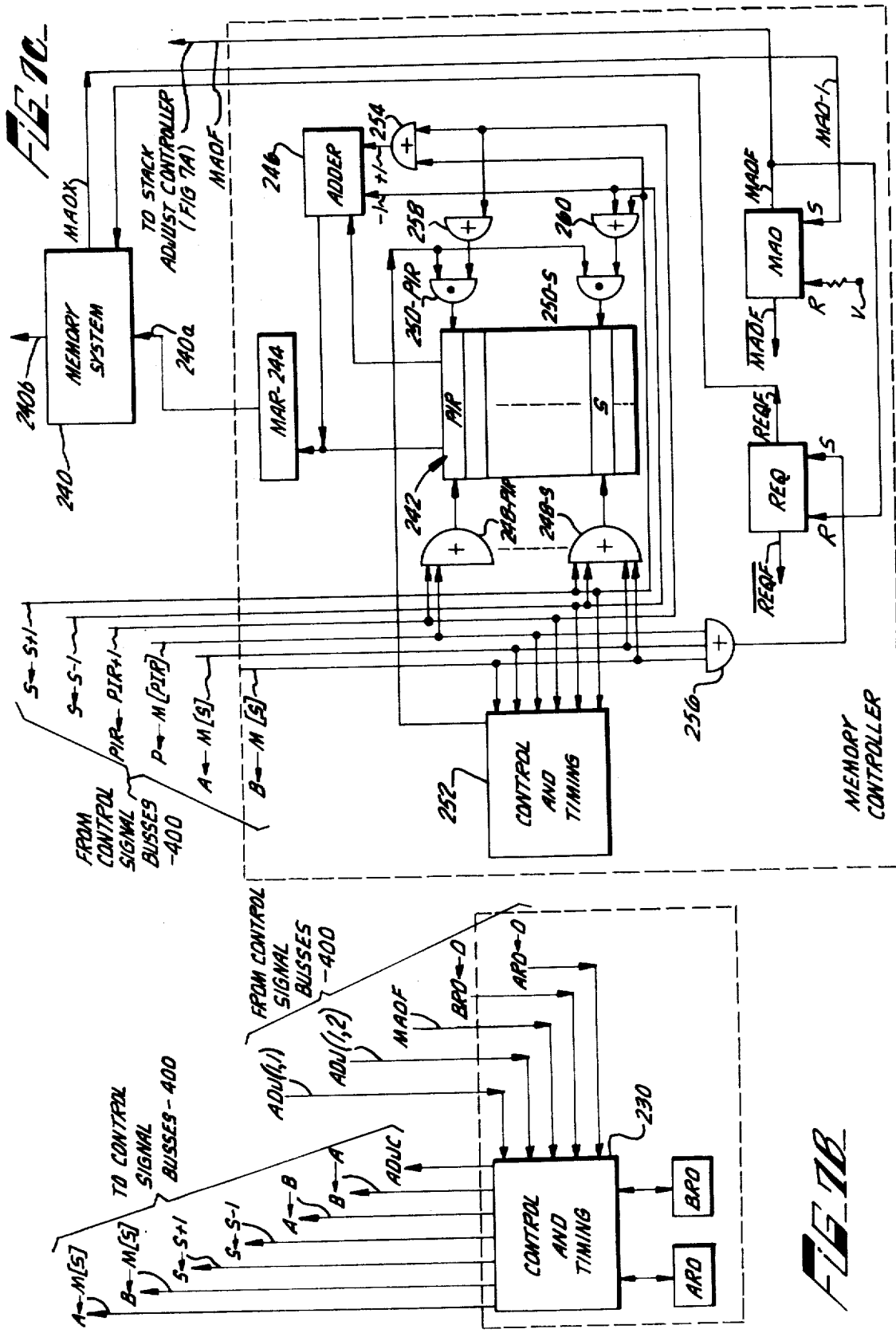

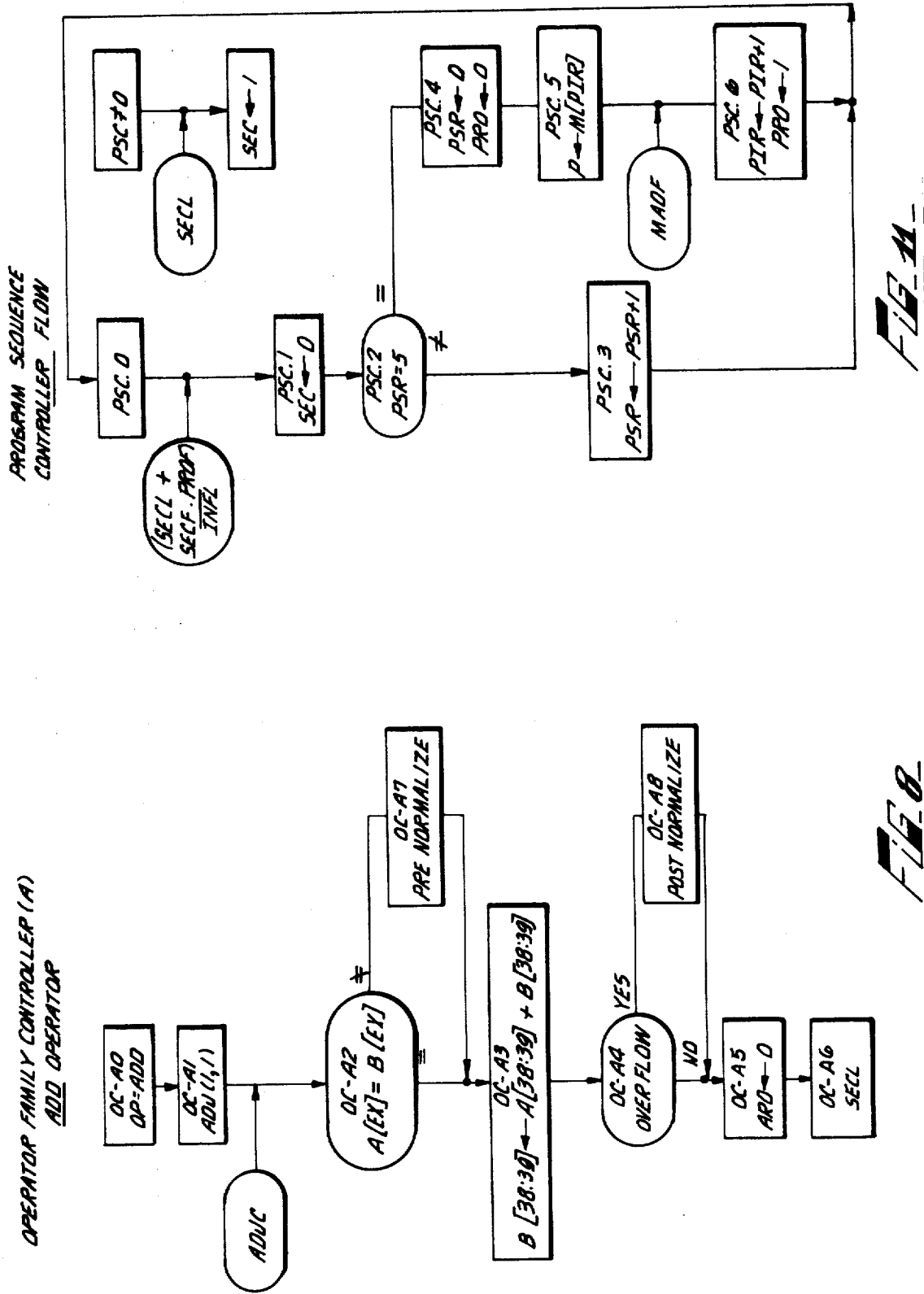

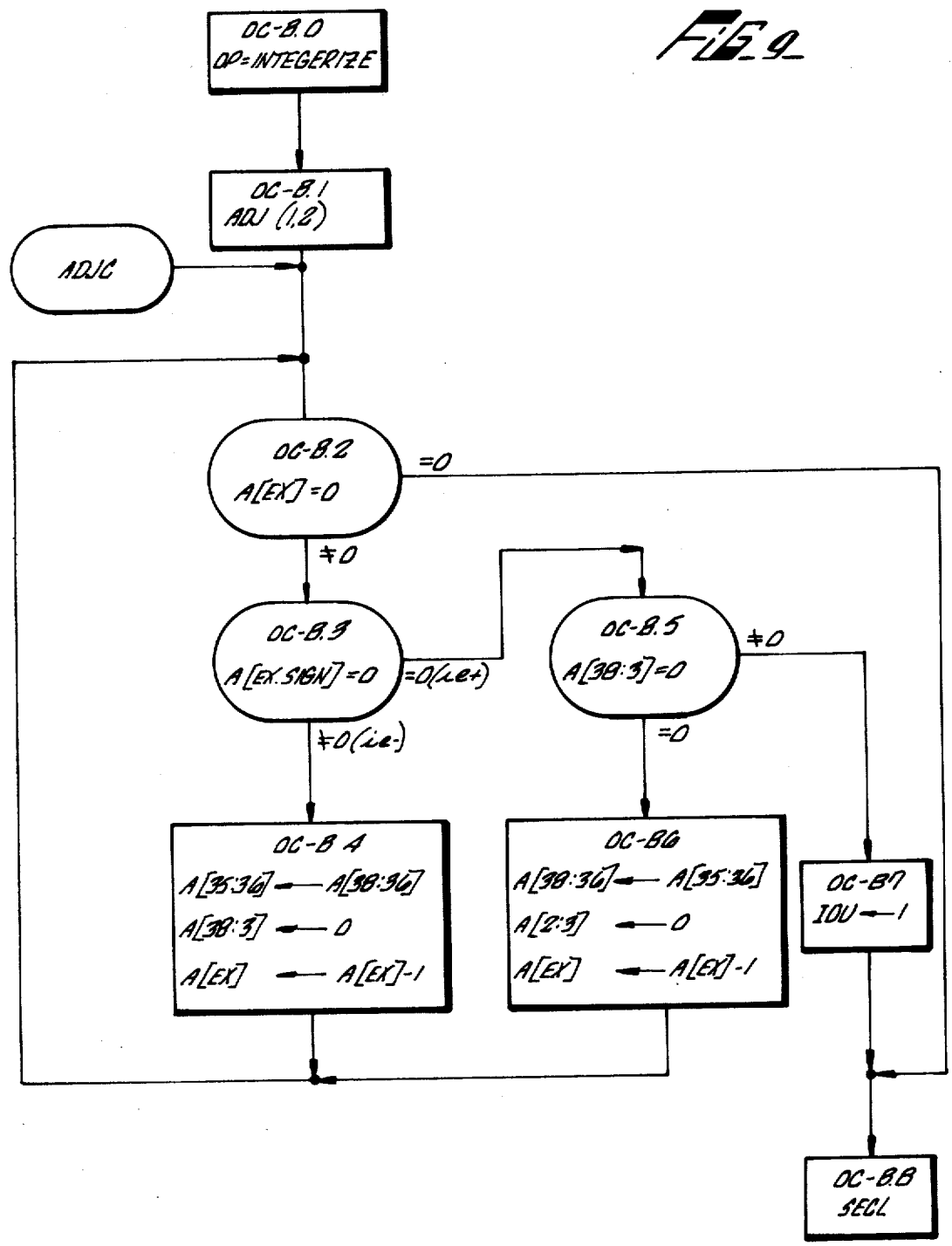

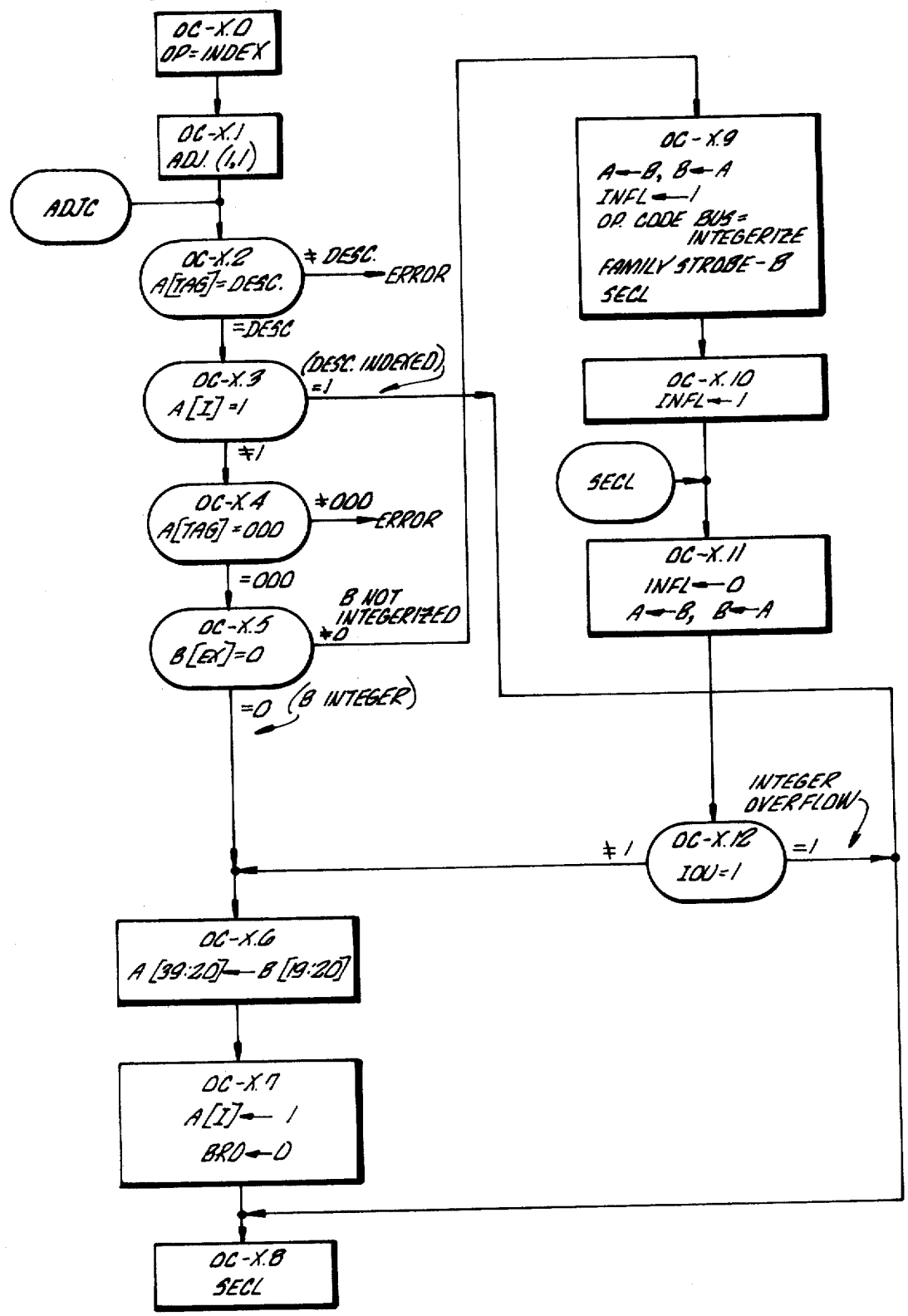

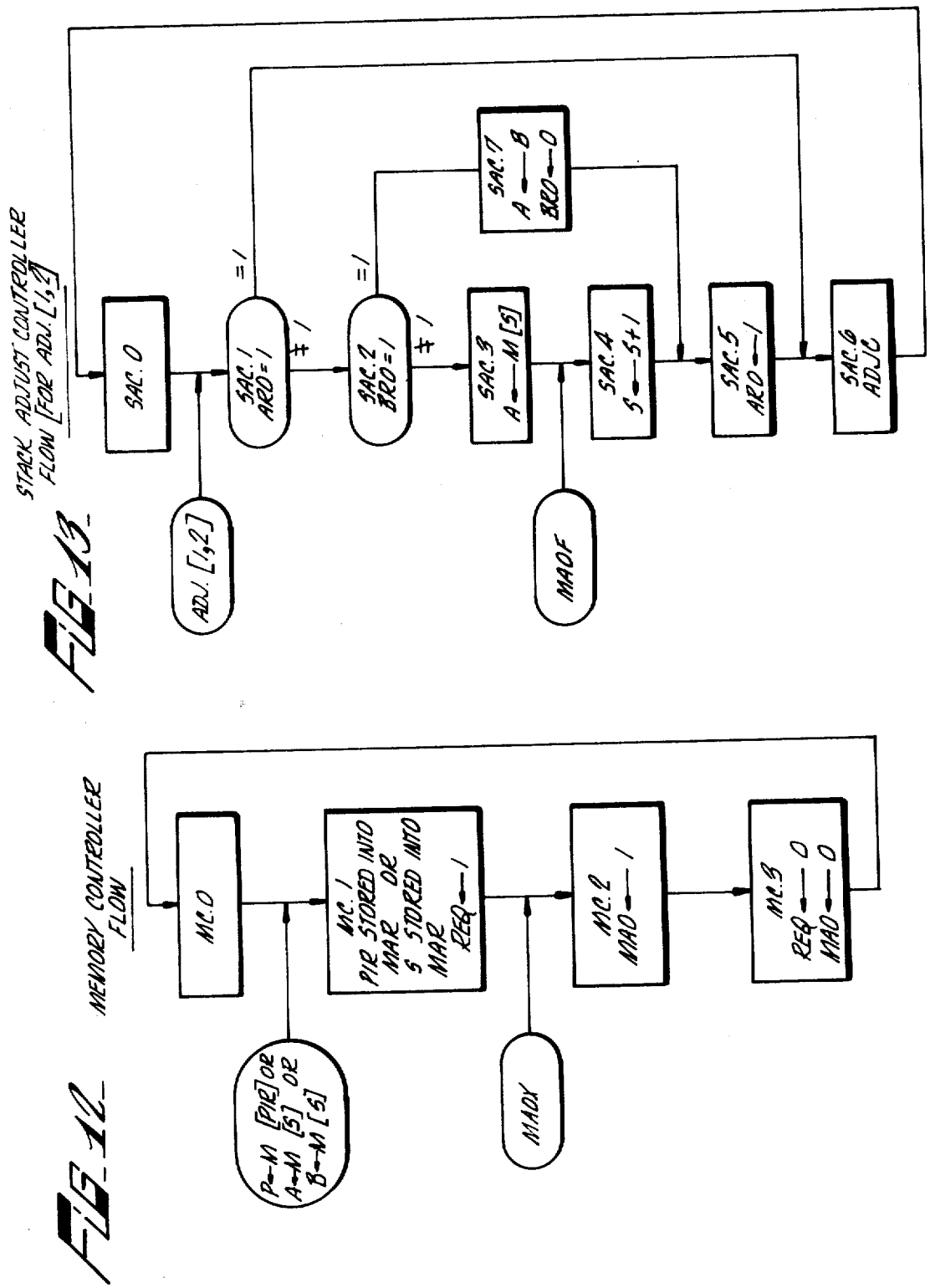

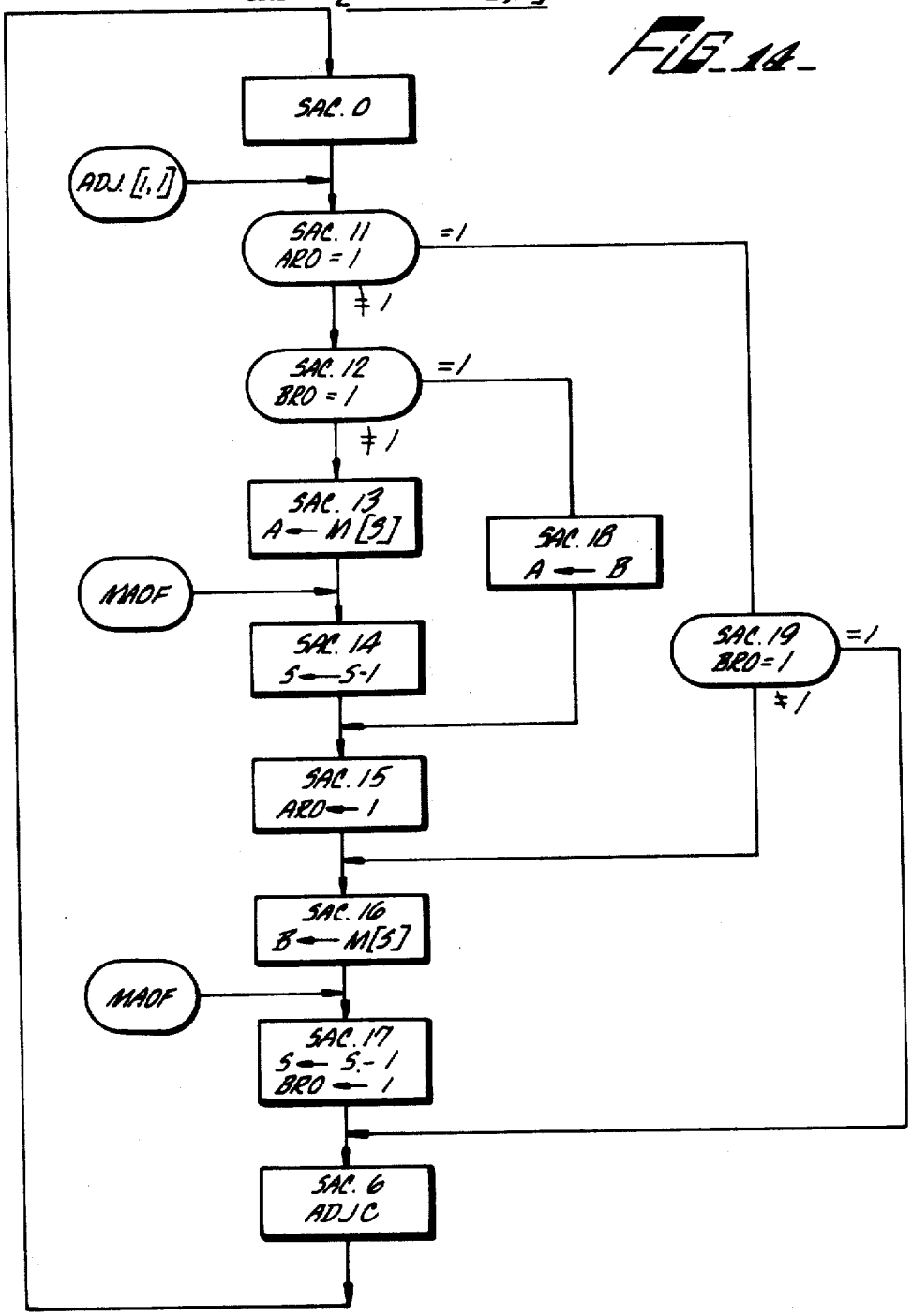

PROGRAM SEQUENCE CONTROLLER TIMING

MEMORY CONTROLLER TIMING

United States Patent Office 3,566,364
Patented Feb. 23, 1971

3,566,364
DATA PROCESSOR HAVING OPERATOR FAMILY CONTROLLERS
Erwin A. Hauck, Arcadia, Calif., assignor to Burroughs Corporation, Detroit, Mich., a corporation of Michigan
Filed July 19, 1968, Ser. No. 746,121
Int. Cl. G06f 9/00, 9/18
U.S. Cl. 340—172.5
29 Claims

ABSTRACT OF THE DISCLOSURE

A data processor has a number of different physically separate operator family controllers, each for forming control signals predetermined by an operator provided thereto. A common functional resources apparatus manipulates data responsive to control signals from any one of the family controllers. A program controller provides operators to the family controllers for execution.

BACKGROUND OF THE INVENTION

Field of the invention

This invention relates to digital data processing apparatus and, more particularly, to an improved data processor organization.

DESCRIPTION OF THE PRIOR ART

The parts of a data processor may be divided into two general types of logic circuits, functional logic and control and sequencing logic. The functional logic includes such hardware networks as adders, storage registers, shifting networks, transfer busses, memories, etc. which are the basic functional facilities from which the machine operator algorithms are built. The control and sequencing logic is that portion of the machine's logic circuitry which coordinates and controls the functional logic.

Prior art data processing machines are generally constructed with a single set of control and sequencing logic which is a single homogeneous unit. Machines are built in this manner in the interest of simplicity of control structure and low hardware costs.

A typical set of control and sequencing logic consists of a single operator code register and a single sequence counter, or the equivalent in control flip-flops. The operator code register connects to a decoding network which has an operation code signal line for each operator. The decoding network forms a signal on the operation code signal line corresponding to the particular operator stored in the operator code register. The sequence counter also connects to a decoding network which has a sequence state line for each state of the sequence counter. The decoding network activates a sequence state line which corresponds to the particular state of the sequence counter.

The actual hardware operations of the functional logic circuits are controlled by a network of gating circuits also located in the sequence and control logic circuits. This network of gating circuits is typically formed by "anding" a particular operation code signal line with a sequence state line to form a signal to activate the desired hardware function. In many instances the control is also dependent on data conditions.

Typically, the operator code register, sequence counter and their decoders are placed in a central location on a backplane of the computer. The code signal lines and sequence state lines from the decoders are then distributed throughout the backplane panels where the lines are connected to the network of gating circuits.

This homogeneous organization of the control and sequencing logic creates serious problems. One problem arises because of the use of large scale integrated circuitry. When large scale integrated circuitry is used in a machine there are a large number of interconnections which are made internally in each integrated circuit. Yet it is imperative that the external connections to the integrated circuits be kept to a minimum. This is difficult with prior art computer organization because of the large number of connections generally required. Therefore, there is a need to organize a computer to minimize the interconnections.

A further problem arises due in part to the homogeneous construction of the control and sequencing logic as the speed of the machine is increased. This comes about because time delays inherent in wiring and gating severly limit the speed with which the machine may operate. For example, the longer the signal lines the longer it takes for a signal to propagate down the line. Also, as gates are added in series to transmit a signal each gate adds a significant delay to the signal. Therefore, to reduce signal delays it is a requirement that signal lines be kept short and the number of gates connected in series in each signal line be minimized. However, as opposed to this requirement is the requirement to make some data processors quite large. As a result, in prior art machines the signal lines from the operator code decoder and from the sequence counter decoder become quite long as they wind through the backplanes of the data processor to make the various connections.

Also as machines are made larger, more gates must be activated by the same operator code and sequence counter decoder signal lines. As a result, great loads are placed on these signal lines requiring serial gating or buffer circuits in the lines to keep the decoders for these lines from becoming overloaded. However, additional time delays are introduced in the signal lines from each gate connected in series in a signal line and from each buffer circuit in a signal line.

Another problem with prior art data processors is that the organization makes it difficult to make an orderly distribution of the signal lines from the operator decoder and the sequence counter decoder. The reason for this is that there is only one operator code decoder and one sequence counter decoder, and, as a result, the signal lines from the decoders must be routed in a random fashion around the computer backplane to where each gate is located which requires the signal line.

Still another problem arises because of what are termed "fan out" and "fan in" problems in prior art data processors. "Fan out" is used to refer to the problem of distributing each signal line from the operator code decoder and the sequence counter decoder out to all of the gates utilizing each line. "Fan in" is used to refer to the problem of taking the output lines of all gates which activate the same function and combining them together to activate such function. Extensive fan out and fan in problems arise in large data processors. By way of example, in one machine it may be necessary to fan in 300 lines to activate just one function. These fan out and fan in problems are magnified in prior art machines because there is no real orderly way to distribute the lines involved.

Yet another problem in the prior art machines is the practical one of designing the control and sequencing logic which becomes quite complex because of the homogeneous organization.

The present invention significantly reduces the forementioned problems.

SUMMARY OF THE INVENTION

The present invention is organized so that the operator and control counter decoders are placed in the actual areas of the machine where the control equations are implemented. The control equations are the ones that actuate the actual hardware functions such as add, transfer, read memory etc. This organization is accomplished by partitioning the control and sequencing apparatus, which is homogeneous in the prior art, into independently functional units, referred to as operator family controllers. Typically, a set of sixteen related operators are executed by each of the operator family controllers. A different set data processor comprises a plurality of operator family controller.

In a preferred embodiment the operator family controllers are physically separated in different modules of a backplane.

Briefly, an embodiment of the present invention in a data processor comprises a plurality of operator family controllers. Each operator family controller forms control signals predetermined by an operator. A functional resources apparatus manipulates data responsive to control signals from any one of the operator family controllers. Means is provided for coordinating and controlling the operation of the controllers. In a preferred embodiment each operator family controller is operatively independent. Another important feature of a preferred embodiment is that each independent operator family controller may call upon another operator family controller to complete a portion of its algorithm.

Among advantages which may be achieved in a data processer embodying the present invention are the following: The signal lines out of the operator decoder and the sequence counter decoder are kept locally in the particular operator family controller where the decoders are located and, as a result, these signal lines are only distributed over a very limited area of the data processor backplane. The direct current loading problems which were formerly distributed over the entire backplane in the prior art are localized to the immediate area of the family controller. Control signals for the basic machine functions are collected and transmitted in an orderly manner, minimizing the fan in and fan out problems normally associated with prior art apparatus. The functional resources apparatus, around which the operator family controllers are built, may be extended down to the level of the macro machine function.

With this organization of the present invention the job of the logical designer for the various operator algorithms may be greatly simplified. This results from the fact that the family controllers are independent functioning units permitting an operator family controller executing an operator to call into operation another operator family controller to finish a particular operation where the necessary circuitry is already implemented. This becomes a very vital facility for future data processors which implement many functions formerly handled by software or programming.

DESCRIPTION OF THE DRAWINGS

FIG. 2 is a sketch illustrating the wiring backplane of a prior art data processor;

FIG. 3 is a sketch illustrating a wiring backplane for a data processor embodying the present invention;

FIG. 4 is a schematic and block diagram showing details of the operator family controller (A) of the data processor shown in FIG. 1;

FIG. 5 is a sketch showing the control signal bus 400 of the data processor shown in FIG. 1;

FIG. 6 is a schematic and block diagram showing the details of the program sequence controller 300 of the data processor shown in FIG. 1;

FIGS. 7A, 7B and 7C are schematic and block diagrams of the hardware functional resources 200 of the data processor shown in FIG. 1 which include a top of stack register controller (FIG. 7A), a stack adjust controller (FIG. 7B), and a memory controller and memory system (FIG. 7C);

FIG. 8 is a flow diagram illustrating the sequence of operation of the operator family controller (A) during execution of an INTEGER ADD operator;

FIG. 9 is a flow diagram illustrating the sequence of operation of the operator family controller (B) during execution of an INTEGERIZE operator;

FIG. 12 is a flow diagram illustrating the sequence of operation of the memory controller;

FIGS. 13 and 14 are flow diagrams illustrating the sequence of operation of the stack adjust controller;

FIG. 16 is a timing diagram illustrating the sequence of operation of the program sequence controller;

FIG. 17 is a timing diagram illustrating the sequence of operation of the memory controller;

GENERAL DESCRIPTION

Figure 1:
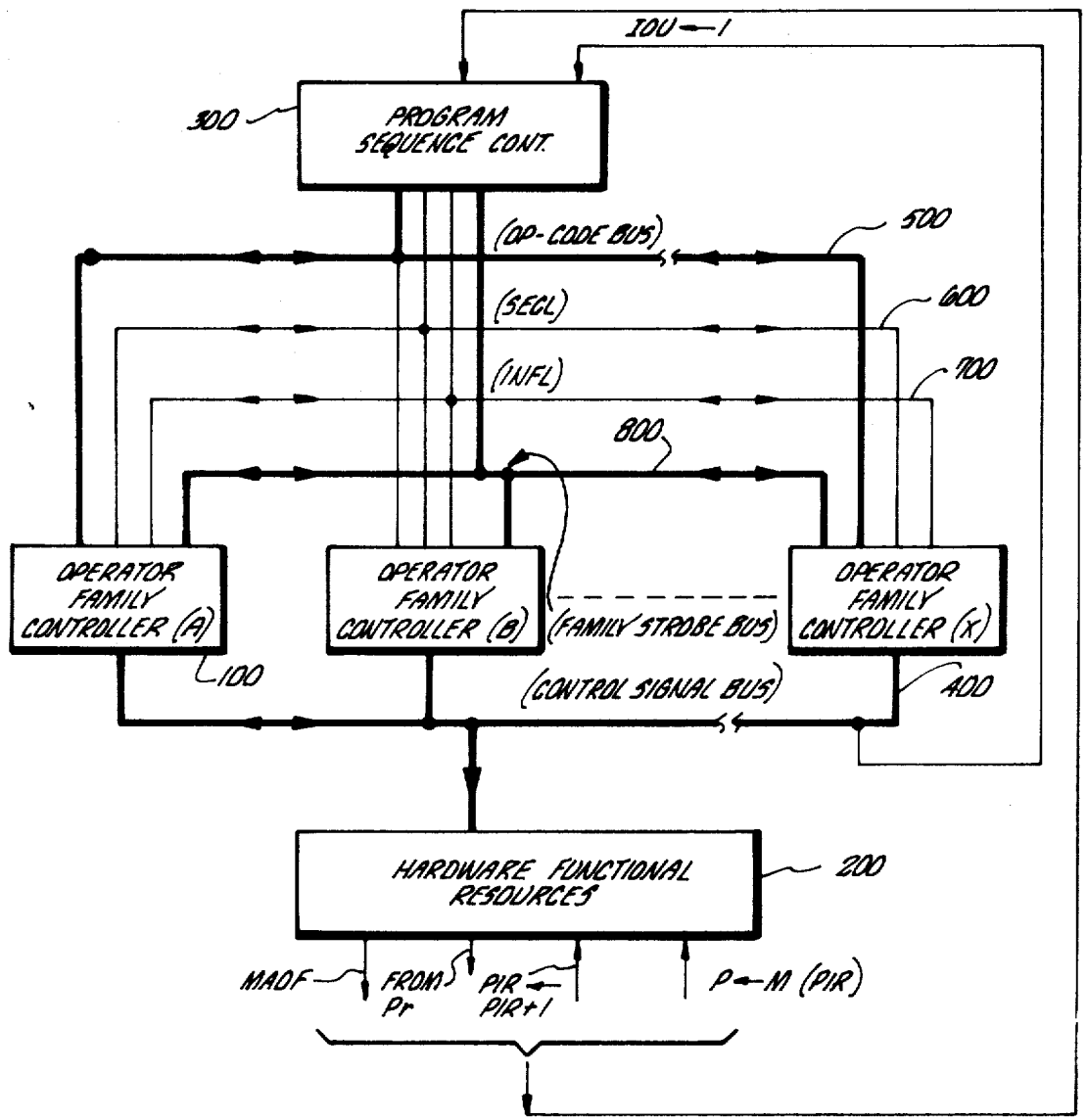
FIG. 1 is a block diagram of a data processor and embodying the present invention.

Refer now to the general block diagram of a data processing system shown in FIG. 1 and embodying the present invention. The data processor includes operator family controllers A, B-X. Each operator family controller contains an operator code register, a sequence counter and a control equation network (not shown in FIG. 1) to sequence and control the various machine functions. A hardware functional resources 200 includes adders, storage registers, shifting networks, transfer busses, stack adjusting apparatus, memories and other facilities which actually manipulate data and carry out the operator algorithms under control of control signals from the controllers 100. Typically, twenty related operators are executed by each operator family controller 100. A different set of operators is implemented in each.

Control signals are formed by each operator family controller to sequence the operation of the hardware functional resources 200. The control signals from each operator family controller are bussed over a common set of two way lines referred to as control signal bus 400 from the operator family controllers to the hardware functional resources 200.

To be explained in more detail, each operator family controller has an output at which the control signals are formed. Most of the control signal lines have corresponding control signal lines in each of the operator family controllers. A control signal on a control signal line in one operator family controller will cause the same functional operation in the functional resources 200 as a control signal on the corresponding control signal line in another operator family controller (i.e. add, transfer, etc.). Because of this organization, the control signal lines from each operator family controller which activate the same function in the hardware functional resources 200 are connected to the same line in the control signal bus 400 and a separate line is provided in the bus 400 for each different function such add, transfer, etc. As a result, a tap from one of the lines in the control signal bus 400 to the hardware functional resources 200 can be used to transfer a signal from any operator family controller to the hardware functional resources 200. Each line in the control signal bus 400 is located in a special backplane circuit and is tuned similar to a transmission line.

The operation of the operator family controllers 100 are coordinated by a program sequence controller 300. The program sequence controller 300 fetches program instructions from the memory of the hardware functional resources 200 and performs a gross decoding function to select the operator family controller 100 for each operator. The program sequence controller 300 normally applies the next operator code to be executed on the operator code bus 500. The operator bus 500 has a tap connected to each of the operator family controllers 100. Each time an operator family controller completes execution of an operator it generates an operation complete signal on an SECL bus 600. This causes the program sequence controller 300 to apply a strobe signal to the particular operator family controller 100 corresponding to the operator. The signal is transmitted on one of a plurality of lines in a family strobe bus 800. One line is provided in the family strobe bus 800 for each operator family controller. The operator family controller 100 is responsive to its strobe signal on the corresponding line to receive, store, and cause execution of the next operator being applied to the operator code bus 500.

The program sequence controller 300 also responds to the operation complete signal on the SECL bus 600 by causing the next operator for execution to be placed on the operator code bus 500.

The ability of an operator family controller to generate an operator code and activate the operation of any other operator family controller is of considerable importance and will now be briefly explained. It is important to note that the operator code bus 500 has a group of bi-directional lines that connect to all of the controllers in such a manner that the operator family controllers may not only receive an operator from the program sequence controller 300, but that they may also transmit an operator to another operator family controller. In this manner, any one of the operator family controllers may pass an operator to any other operator family controller. Contention for the use of the operator code bus between the operator family controllers 100 and the program sequence controller 300 is resolved by an inhibit fetch signal which is applied by one of the operator family controllers 100 to an inhibit fetch (INFL) bus 700. This allows an operator family controller 100, which is executing an operator provided by the program sequence controller 300, to call on one of the other operator family controllers to complete execution of a portion of the operator algorithm.

For example, assume the program sequence controller 300 activates the operator family controller (A). This operator family controller is referred to as the primarily activated controller. The primarily activated controller commences execution of the operator received from the program sequence controller 300. If, during the execution of the operator, it is found that one of the other operator family controllers contains the control and sequencing logic to carry out a portion of the operator being executed, the operator family controller 100 then applies a control signal on the INFL bus 700 which causes the program sequence controller 300 to remove the next operator code from the operator code bus 500. The primarily activated controller then generates the appropriate operator and applies the operator to the operator code bus 500. Subsequently, the primarily activated controller applies a control signal to the family strobe bus activating the operator family controller (secondary operator family controller) corresponding to the operator applied on the operator code bus 500. This causes the secondary operator family controller to execute the operator applied to the code bus 500. When the secondary operator family controller completes its operation, a completion signal is applied on the SECL bus 600. However, the primary operator family controller is still forming the control signal on the INFL bus 700 which causes the program sequence controller not to obtain another operator. Instead, when the signal on the INFL bus terminates, the program controller applies the operator code that was removed back onto the operator code bus 500. The operation complete signal on the SECL bus causes the primarily activated controller to remove the signal on the INFL bus 700 and to finish execution of the operator which it started out to execute. Upon completion, an operator complete signal is formed on the SECL bus 600 causing the program sequence counter 300 to again apply a control signal on the family strobe bus 800 to activate the operator family controller corresponding to the next operator being applied on the operator code bus 500.

Because of the ability of one operator family controller to call another operator family controller into operation, as described above, duplication of control and sequencing logic between operator family controllers is minimized.

DETAILED DESCRIPTION

With the general organization of the data processor of FIG. 1 in mind, consider the way in which the circuitry is organized and mounted in the backplane of the data processor. FIG. 2 is a sketch illustrating the way in which the control and sequencing logic of a prior art data processor is implemented, whereas FIG. 3 is a sketch illustrating how the backplane of a data processor embodying the present invention is implemented. Referring first to the prior art backplane of FIG. 2, it will be noted that there are three modules, #1, #2 and #3. In module #1 is shown the operator decoder (OP. DEC.) and the sequence counter decoder (Jc. DEC.). The operator decoder is the one that decodes operators contained in the operator register (not shown) and the Jc. decoder is the one which decodes the state of the sequence counter, sometimes referred to as the "J counter," (not shown in FIG. 2). One of the outputs of the operator decoder is illustrated by a dashed line T0, whereas one of the outputs of the Jc. decoder is indicated by a broken line A. As illustrated in FIG. 2, the output signal lines of the operator decoder and the Jc. decoder wind about through module #1 (in which they originate) down through module #2 and module #3. Gates G are shown to indicate the connections made by the lines To and A. It is quite evident from the computer backplane illustrated in FIG. 2 that in the prior art the output signal lines from the two decoders become quite unruly in order to make conections to various gates scattered about in the modules.

In contrast to the prior art backplane, FIG. 3 is a sketch illustrating the layout of a data processor backplane embodying the present invention. #A through #X operator family controller modules 100 are shown, one for each of the operator family controllers A through X. Referring to operator family controller A in module #A, an operator decoder (OP. DEC.) is shown with two output signal lines T0, T10. The sequence counter (Jc. DEC.) is shown in module #A having output signal lines A, D. The output signal lines T0, A are combined together by an AND gate G and the output thereof is connected to the input of a signal amplifier or buffer B. Similarly, the output signal lines T10 and D are connected together by another AND gate (G). The outputs of the two gates (G) are connected together to the input of the buffer B. It will be apparent to those skilled in the art that the output of the two gates G are logically ORED together by making a direct connection therebetween as illustrated in FIG. 3. The buffer B in turn drives one of the lines of the control signal bus 400 mentioned in connection with FIG. 1. Each line of the control signal bus 400 is a transmission line having its two ends terminated in its characteristic impedance Z. Each line of the control signal bus 400 is terminated in its characteristic impedance so as to minimize the amount of time for a signal to travel from one end of the line to the other and for the signal to be removed from the line after application.

The line of the bus 400 shown in FIG. 3 passes from module to module. Within each module a connection is made to another driver B which also may apply a control signal to the transmission line 400, similar to the buffer B in module #1. The circuits for the other modules are not shown but are indicated by dashed lines in FIG. 3. Although only one line of the bus 400 is shown in FIG. 3, it should be understood that there are many similarly arranged lines in the bus 400 passing from module to module.

FIG. 3 contains a block illustrating the hardware functional resources 200. Illustrated in the hardware functional resources 200 is a gate G having its input connected to a terminal on the one line of the bus 400 shown in FIG. 3. A control signal applied on the one line of the bus 400 shown in FIG. 3 by any one of the operator family controllers in modules #A through #X is received by the gate G in the hardware functional resources 200. The gate G in the hardware functional resources 200 is operative to activate the corresponding function in the hardware functional resources. For example, if the line of the bus 400 shown in FIG. 3 is the one which causes the content of a register to be transferred into another register, gate G is the gate that causes the actual transfer to take place.

Each operator family controller in modules #B through #X is similar to the one for module #A, that is, there is an operator decoder and a Jc. decoder in each module which have outputs connected to gates and to buffers which apply control signals on the same and other lines in the bus 400.

It will now be evident that a very logical and orderly system is provided wherein the same function in the hardware functional resources 200 can be activated by any one of the operator family controllers by merely applying a control signal to the corresponding line of the bus 400.

Refer now to operator family controller A shown in FIG. 4. The operator family controller A is shown below the dashed line in FIG. 4, whereas the operator code bus 500, the SECL bus 600, the INFL bus 700 and the family strobe bus 800 are shown above the dashed line. To be explained in more detail, a grossly decoded operator requires four lines for transmission of its grossly decoded signal. These lines are represented by #1 through #4 of the operator code bus 500. Each of the four lines of the operator code bus 500 is a line which is terminated at each end in its characteristic impedance. The termination is illustrated by impedance elements Z for line #4. Only the termination for bus #4 is shown, it being understood that each of the other busses # through #3 is similarly terminated.

The SECL bus 600 is a single line on which signals may be transmitted in either direction. The SECL bus is terminated in its characteristic impedance (not shown), similar to bus #4 of the operator code bus 500.

The INFL bus 700 is also a single line. However, in contrast to the other busses, the INFL bus 700 only transmits signals in one direction, that is signals are only applied by the operator family controllers to the INFL bus for transmission to the program sequence controller 300, not in the opposite direction.

The family strobe bus 800 has strobe lines A through X, corresponding to the operator family controllers A through X, respectively. Similar to the operator code bus #4, each line of the family strobe bus 800 is terminated in its characteristic impedance (not shown). The connection of the busses 500, 600, 700 and 800 to the program sequence controller 300 will be described in detail in connection with the program sequence controller shown in FIG. 6.

Consider now the details of the operator family controller A. The operator family controller A includes an operator register 102 and a Jc. counter 104. The Jc. counter 104 is the sequence counter for the operator family controller, whereas the operator register 102 is the register in which operators are stored for execution by the operator family controller. Operator and Jc. decoder 103 and 105 are connected to the output of the operator register 102 and the Jc. counter 104, respectively.

The operator decoder 103 has a plurality of output signal lines (indicated by the heavy line), one output line corresponding to each different operator stored in the operator register 102. Similarly, the Jc. decoder 105 has a plurality of output signal lines (indicated by the heavy line), one output line corersponding to each state of Jc. counter 104. The output signal lines from 103 and 105 include the ones illustrated as lines T0, T10, A and D in FIG. 3.

A gating network 106 contains gates which combine the output signal lines from the decoders 103 and 105, apply control signals through buffers 107 to the indicated output control lines 108. The control signal lines 108 are connected to the control bus 400. The gating network 106 has other input lines connected to the control signal bus 400 and are illustrated at 110.

The operation of the operator family controller is initiated by receipt of an appropriate strobe signal and an operator designating the desired operation. To this end, AND gates 114–#1 through 114–#4 store the operator code signal on the operator code bus 500 into the operator register 102. The control for causing an operator code on the bus 500 to be stored comes from operator family strobe bus A and the SECL bus 600.

An S flip-flop is provided for storing an indication that the operator family controller A has been strobed by the family strobe bus A. to this end, an AND gate 120 has its inputs connected to the SECL bus 600 and the family strobe bus A. A coincidence of signals on the SECL bus and the family strobe bus A causes the gate 120 to set the flip-flop S into a 1 state which in turn provides an appropriate signal to the gating network 106. Upon completion of execution of the operator family controller A, the gating network 106 resets the S flip-flop to a 0 state.

As indicated above, one operator family controller is adapted so that it can call into operation another operator family controller. To this end, signal drivers 112A through 112X are connected between the output of the gating network 106 and the family strobe bus lines A through X, respectively. The gating network 106 applies a control signal to one of the buffers 112A through 112X which in turn applies a control signal on the corresponding family strobe bus line to activate the corresponding operator family controller. Also, buffers 116–#1 through 116–#4 are coupled between the gating network 106 and the operator code bus lines #1 through #4, respectively. The gating network 106 applies an operator code signal on the operator code bus 500 through buffers 116–#1 through 116–#4 concurrently with the strobe signal applied on one of the family strobe bus lines 800 through the buffers 112.

Also for the purpose of activating or calling into operation another operator family controller is a buffer 113 coupled between the gating network 106 and the INFL bus 700. The gating network 106 applies a signal to the buffer 113 causing an inhibit signal to be formed on the INFL bus 700. The inhibit signal is applied to the INFL bus 700 and remains there until after the secondary activated operator family controller signals completion of its operation by applying a control signal on the SECL bus 600. The inhibit signal on the INFL bus 700 is the one that causes the program sequence controller 300 to remove the next operator code signal from the operator code bus 500 so that the operator family controller A can apply the required operator code thereto.

The SECL bus is used to signal the completion of execution of an operator by an operator family controller. Whenever the operator family controller A completes execution of an operator it applies a signal to a buffer 118 which in turn applies a control signal to the SECL bus 600.

Although the aforegoing description has been directed to operator family controller A, it should be noted that the operator family controllers Z through X are very similar to operator family controller A shown in FIG. 4. Essentially the only differences involved are in the gating network 106 and the connection between the operator family strobe bus 800 and the gates 114 and 120. Since that operator family controllers execute different operators and hence have different sequences of operation, the gating network 106 for each operator family controller is made in accordance with the operators to be executed thereby. Also, whereas operator family controller A has the family strobe bus A connected to gates 114 and 120, operator family controllers B through X have family strobe busses B through X, respectively, connected to their gates corresponding to gates 114 and 120. In this manner each operator family controller is activated by the corresponding family strobe bus.

Since each of the other operator family controllers B through X are essentially the same as that shown in FIG. 4, for family controller A, except for the variations noted above, the details of operator family controllers B through X are not shown herein.

Refer now to FIG. 5 which shows the actual lines in the control signal bus 400. Each line of the control signal bus 400 consists of a line which has each end connected to its characteristic impedance similar to that described hereinabove for the operator code bus #4 (see FIG. 4). Only the top control signal bus, identified by the symbol A←B, has the characteristic impedances Z shown at each end of the bus, it being understood that the other busses have identical terminations. The lines of the control signal bus 400 have been grouped into groups 402 and 404 for purposes of explanation. The lines in group 402 are busses upon which control signals are applied by the operator family controllers A through X to control operations in the hardware functional resources 200. To be explained in more detail, each of the symbols shown for the lines 402 represents some functional operation which takes place in the hardware functional resources 200. For example, A←B indicates that the content of the B register is to be transferred into the A register. Group 404 consists of lines which carry signals used in the gating network 106 and each operator family controller to control the sequence of operation of the corresponding operator family controller.

To this end, the lines of group 402 are connected to the lines 108 going into the gating network 106 of each operator family controller (see FIG. 4), and the lines of group 404 are connected to the lines 110 going into the gating network 106 of each operator family controller (see FIG. 4). The source of the signals applied to the lines of group 404 will be described in connection with the hardware functional resources 200 shown in FIG. 7A.

Consider now the program sequence controller 300 shown in FIG. 6. A control and timing unit 302 is provided and is the basic gating and sequencing unit in the program sequence controller 300. An operator syllable select network 304 is provided to select operator syllables and cause appropriate operator code signals to be applied to the operator code bus 500 and to the appropriate family strobe bus 800. The hardware functional resources 200 contains a P register 206. The P register stores a program word which contains six operator syllables. The program word as forty-eight binary bits and each operator syllable has eight binary bits. The forty-eight bits of the program word contained in the P register are connected to the input of the operator syllable select network 304. A program sequence counter (PSR) 306 counts through the six states, each state corresponding to one of the six operator syllables. The operator syllable select network 304 causes the operator syllable corresponding to the state of the PSR counter 306 to be coupled to output lines #1 through #8 thereof. Bits #1 through #4 of each operator syllable is the particular operator code for execution. Bits #5 through #8 of each operator syllable identify the particular operator family controller corresponding to the operator code. The operator syllable select network 304 applies bits #1 through #4 of each operator syllable to four output lines #1 to #4 (identified by reference numeral 308) which in turn connect to lines #1 to #4 of the operator code bus 500. Bits #5 through #8 of each operator syllable are coupled by the operator select network to a decoder 310. The decoder 310 decodes bits #5 through #8 of each operator syllable and applies an output signal on one of output lines A–X identified by the reference numeral 312. The output lines A–X of 312 are connected to the lines A–X of the family strobe bus 800 (see FIG. 4).

The PSR counter 306 is controlled by the control and timing unit 302. The control and timing unit 302 has inputs connected to the INFL bus 700 and the SECL bus 600.

The control and timing unit 302 has outputs represented by the symbol PIR←1 and P←M(PIR). To be explained in detail, control signals are formed at these output circuits causing the hardware function resources 200 to read a new program word into the P register and do other housekeeping functions. The control and timing unit 302 also has an input MAOF from a MAO flip-flop located in the hardware functional resources 200. A signal at the MAOF input indicates that a memory cycle has been completed and a new program word is contained in the P register.

IOU, PRO and SEC flip-flops are provided in the program sequence controller 300 for controlling and sequencing the operation thereof. The SEC, PRO and IOU flip-flops have outputs SECF, PROF and IOUF at which control signals are applied when the corresponding flip-flops are in a 1 state and $\overline{SECF}$, $\overline{PROF}$ and $\overline{IOUF}$ outputs at which control signals are formed when in a 0 state. The function and operation of the SEC, PRO and IOU flip-flops will be discussed in detail in connection with the flow diagrams.

With the structure of the program sequence controller and the operator family controllers in mind, consider the structure of the hardware functional resources 200, which are shown in FIGS. 7A through 7C. The hardware functional resources 200 is organized into three different controllers and a memory system known as the top of stock register controller (FIG. 7A), the stack adjust controller (FIG. 7B), and the memory controller and memory system 240 (FIG. 7C).

Consider first the top of stack register controller shown in FIG. 7A. The top of stack register controller is the controller which contains registers used to manipulate data and also contains the register in which the program words are stored as they are read from memory prior to being distributed by the program sequence controller 300. An A register 202 and a B register 204 are provided and are used as the top two registers in a stack. The rest of the stack is in the memory system 240 (FIG. 7C). The stack is of the type disclosed in the book entitled "Electronic Digital Systems" by R. K. Richards, published in 1966 by John Wiley & Sons, Inc. on pages 224 through 229, wherein information is placed in the stack and taken out of the stack on a first in, last out, basis.

The P register 206, as mentioned hereinabove, stores the program words from memory.

Information is stored into the A register 202, B register 204, and the P register 206 from the memory in the memory controller (FIG. 7C) through three gates 208, 210 and 212. The gates 208 through 212 each have an input from the memory system in the memory controller. Each gate has two control input circuits. The gates 208, 210 and 212 have inputs from the indicated lines of the control signal bus 400. Additionally, each of the gates 208, 210 and 212 have an input connected to the output MAOF of the MAO flip-flop contained in the memory controller (FIG. 7C). The control inputs from the lines of the control signal bus 400 determine the register into which a word is to be stored and the MAOF output signals the gates when a word has been read from memory and is being applied to the inputs of the gates 208 through 212 and, hence, is ready for storage in the appropriate register.

Consider now the structure of the words read from memory and stored in the A, B and P registers. The information stored in the A and B registers may be of various types including data, descriptors, indirect reference words, etc. However, each of the words contain fifty-two bits of information referred to as bits 0 through 51. In a data word the mantissa portion is stored in cells 0 through 38. A code representing the exponent [EX], an INDEX bit, and a TAG code are stored in the next three sections of the A and B registers. The purpose of this information will be explained in more detail in connection with the operation of the system. However, it should be noted at this point that there is an output circuit from each of the A and B registers which carry the signals corresponding to the exponent, the INDEX bit and the TAG bits identified as A[EX], A[I], A[TAG], B[EX], B[I], B[TAG].

The program words stored in the P register 206 have a different format. Each of the program words stored in the P register 206 contain forty-eight bits referred to as bits 1 through 48. Corresponding thereto, the P register 206 contains forty-eight storage cells. The program word is divided up into six syllables referred to as syllables S0–S5. Each of the six syllables contain eight bits. The output circuits of the P register 206 are connected to the program sequence controller 300 as described hereinabove.

The output of the cells 0 through 38 (containing the mantissa) of the A and B registers are connected to two inputs of the adder circuit 214. The adder circuit 214 is a conventional parallel adder that continuously combines the thirty-nine bits of the mantissa of the two words stored in the A and B registers and provides an output corresponding to the sum.

A gate 216 is connected between the output of the adder 214 and cells 0 through 38 of the B register 204. The gate 216 has a control input connected to the indicated control signal bus line. The gate 216 is responsive to a control signal from the indicated control signal bus line for storing the output of the adder 214 into cells 0 through 38 of the B register 204. A timing, gating and control circuit 218 having the indicated inputs from the control signal bus provides certain transfer and control functions that will be described in more detail during the description of operation. For example, the timing, gating and control circuit 218 can transfer all, or portions, of the A register to the B register and vice versa, change portions of the words contained in the A and B registers, etc.

A decoder 220 is connected to the A register. The decoder 220 provides a signal at the A[EX SIGN]=0 output, when the SIGN portion of the exponent is zero (representing a negative sign) and a signal at the A[38:3]=0 output, when the leftmost three bits of the mantissa are zero. The outputs of the decoder 220 are connected to the correspondingly labeled lines of the control signal bus 400.

Consider now the stack adjust controller shown in FIG. 7B. The stack adjust controller contains the control and timing required to adjust information up or down in the stack. The primary function of the stack adjust controller is to cause a word of information to be stored in either or both of the A and B registers (the top two storage positions in the stack). The stack adjust controller contains a timing and control unit 230 and ARO and BRO flip-flops. The timing and control unit has inputs from the indicated lines of the control signal bus 400 and outputs connected to the lines of the control signal bus 400, all as indicated in FIG. 7B. The control and timing unit 230 is responsive to the inputs from the control signal bus 400 for going through a sequence of steps which cause appropriate signals to be formed at the indicated output circuits.

To be explained in more detail, the ARO flip-flop is used to indicate whether the A register contains a word or is empty. The ARO flip-flop is in a 1 state when the A register is full and in a 0 state when it is empty. The BRO flip-flop provides the same function for the B register.

Consider now the memory controller and memory system shown in FIG. 7C. The memory system 240 is a conventional magnetic core memory system well known in the computer art which receives an address and, in response to a control signal at the REQF output of the memory controller, either reads or writes in an addressed memory location. Information is read out and written into the memory system in parallel a complete word, composed of fifty-one bits, at a time. An address is received at the input 240a and the information read out of the memory is applied at the output 240b. A control signal at the REQF output causes the memory system 240 to take an address applied on the input 240a and read out the content of the corresponding memory location. After the memory system had read a word out and the word is being applied at the output 240b, a control signal is applied at the MAOX output, so indicating.

Consider now the memory controller. The memory controller contains a storage device 242. The storage device 242 may be constructed in a number of different ways but can be considered for purposes of explanation as a plurality of registers each of which stores an address. It can also be considered as including gating which allows information to be coupled to an adder 246 and from an adder 246 to any one of the registers therein. Only two registers are specifically labeled in the storage 242 as they are the only ones specifically needed in the description of operation. These registers are the PIR and S registers. A plurality of gates 248 are used to control the read out of the registers in the storage device 242. One gate is provided for each register. Gates 248–PIR and 248–S are used to apply control signals to the storage device 242 causing the PIR and S registers, respectively, to be read out. Gates 250 are used to control writing into the registers of the storage device 242. One gate 250 is provided for each register. AND gates 250–PIR and 250–S apply control signals to the storage device 242 causing information to be stored into the PIR and S registers, respectively, from the adder 246.

The adder circuit 246 is responsive to an address from the storage device 242 for applying the address unaltered for storage into the MAR register 244. The adder 246 is also responsive to a control signal on the −1 input for subtracting one unit from the address before it is stored back into the storage device 242. The adder 246 is also responsive to a control signal at the +1 input for adding one unit to the address before it is stored back into the storage device 242. The +1 input of the adder 246 is connected to the output of an OR gate 254. The OR gate 254 has its two inputs connected to two of the lines in the control signal bus 400.

A control and timing unit 252 receives control signals from the control signal bus 400 and provides appropriate control signals to the memory controller.

The memory controller also contains two control flip-flops identified as REQ and MAO. The REQ flip-flop has outputs $\overline{REQF}$ and REQF at which control signals are applied when the flip-flop is in 0 and 1 states, respectively. Similarly, the MAO flip-flop has outputs $\overline{MAOF}$ and MAOF in which control signals are applied when the MAOF flip-flop is in 0 and 1 states, respectively. The REQ flip-flop is used to signal the memory system 240 when an access to the memory system is requested by the memory controller. The MAO flip-flop is used to indicate to the rest of the system when a memory read or write operation has been completed by the memory system 240. This indication is provided when the MAO flip-flop is in a 1 state causing a control signal at the MAOF output. The input of the REQ flip-flop for setting it into a 1 state is coupled to the output of an OR gate 256. The OR gate 256 has its inputs connected to the indicated lines of the control signal bus 400. The input of the REQ flip-flop for resetting it to a 0 state is connected to the MAOF output of the MAO flip-flop. Accordingly, the REQ flip-flop is reset into a 0 state in response to a control signal at the MAOF output of the MAO flip-flop.

The MAO flip-flop has its set input for setting it into a 1 state connected to the MAOX output of the memory system 240. Accordingly, the MAO flip-flop is set to a 1 state whenever a control signal is formed at the MAOX output of the memory system 240 indicating that a word has been read out and is being applied at the output 240b. The MAO flip-flop has its reset input connected to a control voltage which causes the flip-flop to be reset immediately after being set to a 1 state.

Although clock signals have not been shown in the system it is understood that clock signals are provided as a separate input to each of the flip-flops and registers shown in the system and the system operates in synchronism with clock pulses. Since the use of clock pulses is well known in the computer art, this detail is not shown in this application, it being understood that such a clock is present.

The AND gates 250-S and 250-PIR have one input connected to the output of the control and timing unit 252 and another input connected to the output of OR gates 258 and 260. The OR gate 258 has its input connected to the indicated line of the control signal bus 400. The OR gate 260 has two inputs connected to the indicated lines of the control signal bus 400.

EXAMPLE OF OPERATION

Consider now the operation of the data processor of FIG. 1. The operation of the system will be discussed by first considering the operation of the operator family controllers followed by the program sequence controller and the hardware functional resources.

Figure 15:
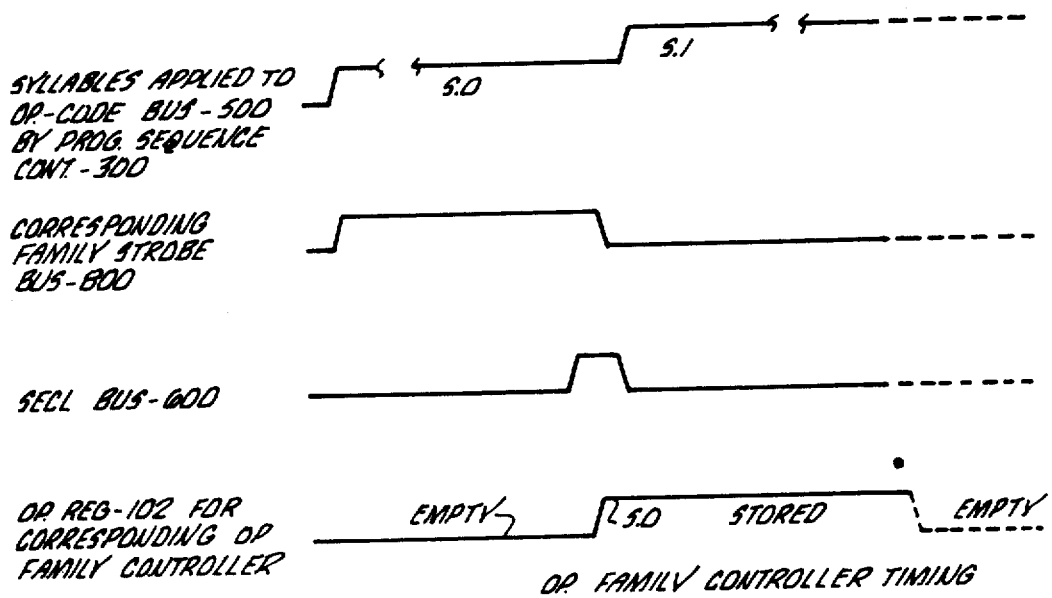
FIG. 15 is a timing diagram illustrating the sequence of operation of the operator family controller.

Consider now the operation of the operator family controller. Reference should be made in the following discussion to FIGS. 4, 8 and 15. FIG. 15 shows the sequence with which syllables are applied to the operator code bus 500 by the program sequence controller 300. S0, S1 . . . S5 refer to the six syllables which are in each program word stored in the P register (FIG. 7A). A control signal is applied on the line of the family strobe bus 800 corresponding to the particular family controller involved. If we are speaking of family controller A, the signal would occur on family strobe bus line A (see FIG. 4). When a family strobe bus line is activated and an operation complete control signal occurs on the SECL bus 600, the gates 114 in the family controller corresponding to the activated family strobe bus 800 cause the operator code signals applied on the operator code bus 500 to be stored into the operator register 102 of the corresponding operator family controller. In the example shown in FIG. 15, syllable S0 is first stored into the operator register. Following execution of the operator, the gating network 106 of the corresponding operator family controller automatically causes the operator to be cleared out of the operator register 102 to make it ready for a new operator. Thus, it will be seen that the operation complete signal occurring on the SECL bus 600 in combination with the strobe signal on the corresponding strobe bus actually strobes the new operator syllable into the operator family controller and initiates operation thereof.

Refer now to FIGS. 4 and 8 and consider the sequence of operation of the operator family controller A during the execution of an ADD operator. The ADD operator is one of the family of operators executed by operator family controller A. The purpose of an ADD operator is to cause two words stored in the A and B registers to be added together and cause the result to be stored back into the B register. The A and B registers are in the functional resources and the operator family controller A form the control signals on the control signal bus 400 which cause this operation to take place.

The operator family controller A has an initial "idle condition" wherein it waits for one of its family of operators to be received. This corresponds to some predetermined state of the J counter 104 in the operator family controller. For purposes of general explanation, the "idle condition" is referred to herein as the OC–AO state. The other states of the operator family controller, which correspond to different states of the J counter 104, are referred herein as states OC–A followed by a numeral, i.e. OC–A1, OC–A2, etc.

Assume now that operator family controller A is in the idle state OC–AO and that an ADD operator is applied on the operator code buss 500. Also assume that control signals are formed on the family strobe bus line A and on the SECL bus. Gate 120 sets the S flip-flop to a 1 state and gates 114 strobe the ADD operator into the operator register 102. This causes the J counter 104 of the operator family controller A to go to state OC–A1.

During state OC–A1 the top two registers of the stack are adjusted so that both contain a word. The top two registers of the stack are the A and B registers (see FIG. 7A). Accordingly, each of these two registers must either already contain a word of information or must be filled.

To carry out this operation, the gating network 106 of operator family controller A forms a control signal at the ADJ (1, 1) which indicates that the A and B registers must be full. The control signal at the ADJ (1, 1) output is applied to the correspondingly labeled line of the control signal bus 400 which in turn activates the stack adjust controller shown in FIG. 7B. The stack adjust controller shown in FIG. 7B in turn causes words to be filled into both the A and B registers (if this has not already been done). This sequence of operation will be described hereinafter during the description of operation of the stack adjust controller.

After the stack adjust controller has either found that both the A and B registers contain words, or after words have been filled into the A and B registers, the stack adjust controller forms a control signal at the ADJC output thereof which in turn applies a control signal to the corresponding line of the control signal bus 400. This control signal, as indicated in the flow diagram, causes the operator family controller A to go from state OC–A1 to OC–A2.

During state OC–A2 the gating network 106 of the operator family controller A causes a comparison for equality to be made between the exponents of the words stored in the A and B registers of the top of stack register controller shown in FIG. 7A. The comparison is made to determine if the exponents are equal so that they can be combined or to determine if they are not equal, this requiring normalizing. The gating network 106 receives the output lines A[EX] and B[EX] from the bus 400 and contains a gating network which compares the two to determine if the exponents are equal or not equal. If the exponents are equal, normalizing is not required and the operator family controller A goes to state OC–A3.

During state OC–A3 the mantissa of the words contained in the A and B registers of the stack register controller are combined together and the result stored back into the B register. The addition of the two words takes place in the stack adjust controller in the hardware functional resources 200 under control of control signals from the operator family controller. To cause this to take place, the operator family controller A forms the control signal at the B[38:39]←A[38:39]+B[38:39] output causing a control signal on the corresponding line of the control signal bus 400. This control signal is received by the stack adjust controller (FIG. 7A) and causes the gate 216 to store the output of the adder (which represents the sum of the two mantissas) 214 back into the mantissa section (cells 0 through 38) of the B register 204. The operator family controller A immediately goes from state OC–A3 to OC–A4.

During state OC–A4 the gating network 106 determines whether an overflow was made during the addition. If an overflow occurred during the addition the timing, gating and control circuit 218 of the top of stack register controller applies a control signal at the OVER-FLOW output causing a control signal on the corresponding control signal bus 400. If an overflow occurred, then the operator family controller A goes from state OC–A4 to state OC–A8 where appropriate action is taken by the data processor. This particular operation is not of significance to the present invention and is not described in detail herein.

Assuming that no overflow occurred, the operator family controller A goes from state OC–A4 to state OC–A5. During the above-mentioned addition, the A register was emptied as its mantissa was combined with the mantissa in the B register and the result stored in the B register. Accordingly, it is necessary for the A register to be marked as empty for future operations. To this end, the ARO flip-flop in the stack adjust controller (FIG. 7B) is set to a 0 state. To cause this action the gating network 106 forms a control signal at the ARO←0 output causing a control signal on the corresponding line of the control signal bus 400. This causes the control and timing unit 230 of the stack adjust controller (FIG. 7B) to reset the ARO flip-flop to a 0 state. Following state OC–A5 the operator family controller A goes to state OC–A6.

During state OC–A6 the gating network 106 applies a control signal to the buffer 118 which in turn applies a control signal to the SECL bus 600, thereby signaling the program sequence controller 300 that the ADD operator is complete and that the next operator presently being applied on the operator code busses 500, can be strobed into the appropriate operator family controller.

Referring back for a moment to state OC–A2, it will be recalled that this is the state wherein the operator family controller A determines if the exponents of the two members to be added are equal. If the gating network 106 determines that the exponents of the two words stored in the A and B registers are not equal, a prenormalize operation is required. To this end, the operator family controller goes to state OC–A7.

During state OC–A7 the normalizing operation takes place wherein the mantissa of the words in the A and B registers are appropriately shifted and the exponents adjusted until the exponents are equal. The details of the normalize operation are not disclosed in detail herein as this is a conventional technique well known in the computer art, and is not necessary for a complete understanding of the present invention.

Consider now the operation of the operator family controller B (indicated in FIG. 1). FIG. 9 is a flow diagram illustrating the operation of the operator family controller B. The INTEGERIZE operator is one of a family of operators that is executed by the operator family controller B. The purpose of the INTEGERIZE operator is to take a floating point word in the top register of the stack (the A register) and adjust it so that it is an INTEGER. Stating it differently, the word is adjusted so that the exponent of the word stored in the A register is zero.

The operator family controller A shown in FIG. 4 is referred to for the description of operator family controller B as it is virtually the same except, as pointed out hereinabove, the gates 114 and 120 are connected to the family stroke bus B rather than A, and the gating network 106 is constructed to execute the INTEGERIZE operator and the other related family operators. Similar to the terminology used for operator family controller A, the various states of the operator controller B are referred to by the symbols OC–B followed by a numeral.

Consider now the operation of the operator family controller B while executing an INTEGERIZE operator, making reference to FIGS. 4 and 9. Initially, the operator family controller B is in its idle condition referred to as OC–B0. Assume that an INTEGERIZE operator is being applied to the operator code bus 500 by the program sequence controller 300 and that control signals are applied on the SECL bus 600 (by one of the operator family controllers) and on the family strobe bus B (by the program sequence controller). The INTEGERIZE operator is stored into the operator register 102 and the S flip-flop is set to a 1 state as described above. The operator family controller B then goes to state OC–B1.

During state OC–B1 the top two registers A and B of the stack are adjusted so that the A register contains a word. However, the B register can either be full or empty. To this end, the gating network 106 of the operator family controller B forms a control signal at the ADJ (1,2) output causing a control signal on the corresponding line of the control signal bus 400. This control signal causes the control and timing unit 230 of the stack adjust controller (FIG. 7B) to cause the top two registers of the stack to be adjusted so that the A register contains a word of information. This operation will be discussed in detail hereinafter.

Assume now that the stack adjust controller has completed its operation and that a word is now stored in the top of the stack (i.e. in the A register). The stack adjust controller forms a control signal at the ADJC output causing a control signal on the corresponding line of the bus 400. This causes the operator family controller B to step into state OC–B2.

During state OC–B2 the operator family controller B determines if the exponent of the word in the top of the stack (A register) is zero or not zero. If the exponent of the word is zero, no integerizing need be performed and the INTEGERIZE operator is terminated. To this end, the gating network 106 in the operator family controller B contains a gating network that checks the lines A[EX] in the bus 400. If the exponent is zero $$(A[EX]=0)$$

the gating network 106 causes the operator family controller B to go to state OC–B8.

During state OC–B8 the gating network 106 causes a control signal to be applied to the buffer 118 which in turn applies a control signal to the SECL bus 600. The control signal on the SECL bus 600 in turn causes the program sequence controller 300 to activate the operator family controller which will be needed to execute the next operator being applied on the operator code bus 500.

Assume that the operator family controller B is back in state OC–B2 but that the word contained in the top of the stack (A register) has not been integerized. This causes the operator family controller B to go to state OC–B3.

During state OC–B3 the operator family controller B determines if the sign of the exponent of the word contained in the A register is positive or negative. The reason for this test is that the mantissa will be shifted to the right if the sign is positive but will be shifted to the left if the sign is negative. The exponent is positive if the decoder 220 forms a control signal at the $$A[EX\ SIGN]=0$$

output and negative if no control signal is applied thereto. To make the test the gating network 106 of the operator family controller B tests the line $A[EX\ SIGN]=0$ control signal bus. If a control signal is being applied thereto it means that the sign of the exponent is positive; accordingly, the operator family controller B goes through states OC–B5 and OC–B6 where the word contained in the A register is shifted octally (by three bits) to the left. Assume that a control signal is formed at line $$A[EX\ SIGN]=0$$

This causes the operator family controller B to go to state OC-B5.

During state OC-B5 a test is made to see whether the leftmost three bits of the mantissa are 0. If the leftmost three bits of the mantissa in the A register are 0, there will be an overflow when the word is shifted to the left. This is an error condition and the operator family controller B signals must signal this condition. To this end, the gating network 106 of the operator family controller B check the control signal bus line $A[38:3]=0$. If a control signal is not formed at this line, it means that the decoder 220 (FIG. 7A) is not detecting zero bits in the leftmost three bits of the mantissa of the word in the A register and that the error condition exists. This causes the operator family controller B to go from state OC-B5 to state OC-B7.

During state OC-B7 the gating network 106 applies a control signal to the line IOU←1 of the control signal bus 400 causing the computer system to take appropriate control action. The operator family controller B then goes to state OC-B8 where the control signal is formed at the SECL control signal bus signaling the end of execution of the INTEGERIZE operator.

Assume now that the operator family controller B is back in state OC-B5 but that a control signal is detected at the $A[38:3]=0$ line indicating that the leftmost three bits of the mantissa in the A register are not zero and, therefore, no overflow will occur upon an octal shift to the left. The gating network 106 of the operator family controller B then causes the operator family controller B to go to state OC-B6. During state OC-B6 the mantissa of the word in the A register is octally shifted to the left, the rightmost three bits in the A register are set to 0, and the exponent is counted down by one unit. To this end, the gating network 106 applies a control signal to the following lines of the control signal bus 400:

$$A[38:36]\leftarrow A[35:36]$$

—which causes the top of stack register controller (FIG. 7A) to shift the mantissa of the word in the A register octally three bits to the left; $A[2:3]\leftarrow 0$—causing the rightmost three bits of the mantissa in A register to be set to zero; and $A[EX]\leftarrow A[EX]-1$—causing the top of stack register controller to count the exponent contained in the A register down by one unit. The actions that take place in top of stack register controller (FIG. 7A) are done under control of the timing, gating and control circuit 218 which receive the control signals on the above-identified lines of the control signal bus 400. Following state OC-B6, the operator family controller B goes back to state OC-B2.

During state OC-B2 the test is again made by the gating network 106 to see if the exponent of the word contained in the A register is zero $(A[EX]=0)$. If the mantissa has not been completely integerized, the exponent has not been reduced to zero $(A[EX]\neq 0)$, the operator family controller B will then again go through states OC-B3, OC-B5 and OC-B6 and return to state OC-B2 repeating these steps until the exponent has been reduced to zero $(A[EX]=0)$ and the mantissa of the word in the A register is completely integerized. When in state OC-B2 the exponent is detected as being zero $(A[EX]=0)$ the operator family controller B goes on to the last state OC-B8, where the control signal is formed on the SECL bus 600 signaling the end of the operator.

Return to state OC-B3 and assume that the gating network 106 detects that the sign of the exponent contained in the A register is negative $(A[EX\ SIGN]\neq 0)$. Under this condition the mantissa of the word in the A register must be shifted right. To this end, the operator family controller B goes from state OC-B3 to OC-B4.

During state OC-B4 the mantissa of the word contained in the A register is shifted octally three bits to the right, the leftmost three bits in the mantissa A register are set to zero and the exponent is counted up one. To this end, the gating network 106 of the operator family controller B applies control signals at the following lines of the control signal bus 400: $A[35:36]\leftarrow|38:36]$—causing the top of stack register controller (FIG. 7A) to shift the mantissa of the word contained in the A register octally three bits to the right; $A[38:3]\leftarrow 0$—causing the top of stack register controller to store zeroes into the leftmost three bis of the mantissa in the A register; and $A[EX]\leftarrow A[EX]-1$—causing the top of stack register controller to count the mantissa of the word contained in the A register down by one unit. Similar to state OC-B6, when in state OC-B4 the operator family controller B then returns to state OC-B2 where a test is again made to see if the exponent has been reduced to zero. If not, states OC-B3, and OC-B4 are again entered repeating the operations discussed above. Finally, the exponent will be reduced to zero. When this condition occurs a control signal is formed at the line $A[EX]=0$ of the control signal bus 400 causing the operator family controller B to go from state OC-B2 to state OC-B8 where a control signal will be formed at the line SECL of the control signal bus signaling the end of the execution of the INTEGERIZE operator.

Consider now the operation of the operator family controller X. The INDEX operator is one of the family of operators executed by the operator family controller X. Before considering in detail the operation of the operator family controller X, a brief description will be given of the objective of the INDEX operator.

Figure 19:
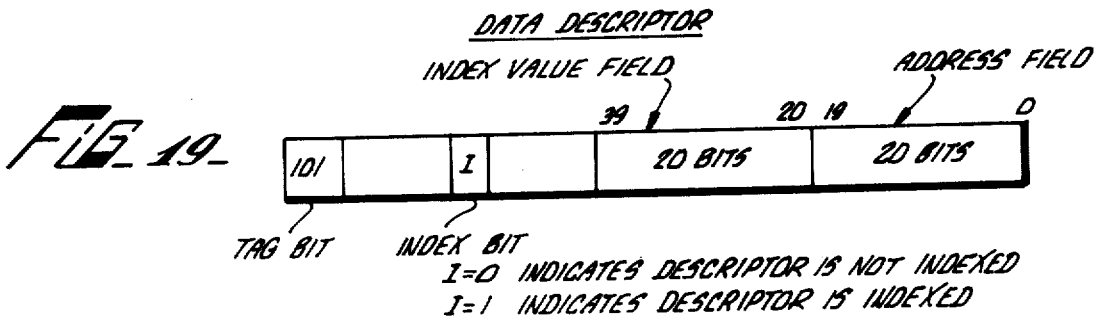
FIG. 19 is a sketch illustrating the word structure of a Data Descriptor shown in the stack of FIG. 18.
Figure 18:
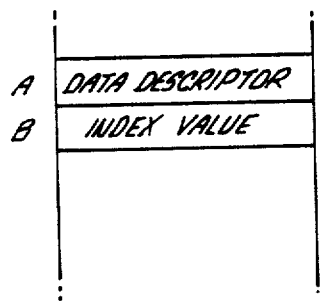
FIG. 18 is a sketch illustrating the structure of a typical stack of information utilized by the data processor of FIG. 1. The top two words in the stack are illustrated prior to the execution of an INDEX operator.

FIG. 18 shows an example of a stack. As indicated, the top two registers (the A and B registers) of the stack, contain a data descriptor and an index value, respectively. FIG. 19 is a sketch illustrating the word construction of a data descriptor. The first three bits of the data descriptor are 101 which form a TAG identifying the word as a data descriptor. The next information of significance is the I bit or index bit. When the I bit is a 0, it indicates that the descriptor has not been indexed, whereas a 1 indicates that the descriptor has been indexed.

The meaning of an indexed or not indexed data descriptor will become more apparent when considering the next two fields of the data descriptor. The next field of significance in the data descriptor is twenty bits which is an index value field followed by another field of twenty bits which is an address field. Thus, bits 0 through 19 form the address field and bits 20 through 39 form the index value field. An unindexed data descriptor is one wherein the address field is the address of the base of a field of continuous memory locations in memory and the index value field specifies the length or number of memory locations in that field.

An indexed data descriptor (the I bit is a 1 bit) is one wherein the address field is the address of the base of a field of continuous memory locations in memory but the index field is a value which, when added to the address field, gives the exact location of a specific memory location in the field. In other words, in an indexed data descriptor the address field added to the index value field gives the address of a specific word desired in the field.

In the example of the stack shown in FIG. 18, it is assumed that the data descriptor has not been indexed and the index value in the B register is to be placed in the index value field of the data descriptor in the A register. This is precisely the purpose of the INDEX operator.

Figure 10:
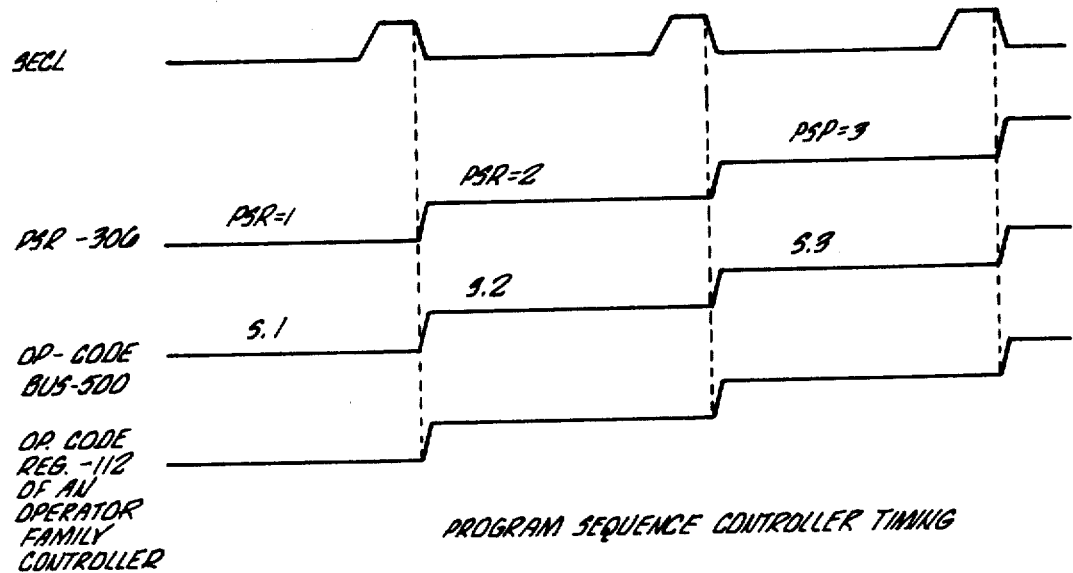
FIG. 10 is a flow diagram illustrating the sequence of operation of the operator family controller (X) during execution of an INDEX operator.

The operator family controller X includes the INDEX operator as one of the family of operators which it executes. Similar to the other controllers FIG. 4 will be used in the following discussion to illustrate the structure of the operator family controller X. FIG. 10 is a flow diagram illustrating the sequence of operation of the operator family controller X while executing the INDEX operator. Reference should be made to FIGS. 4 and 10 during the following discussion. Similar to the other operator family controllers, the states of the operator family controller X are illustrated in FIG. 10 by the symbols OC–X followed by a numeral. The numeral indicates the various states of the operator family controller X.

Consider now the actual operation of the operator family controller X. Initially the operator family controller X is in an idle condition, state OC–X0. The operator family controller X remains in this state until an INDEX operator is strobed from the operator code bus 500 into the operator register 103 and the S flip-flop is set to a 1 state in the operator controller X. In this manner the operator family controller X is initiated and starts executing the INDEX operator.

The operator family controller X then goes to state OC–X1 wherein the stack is adjusted so that the top two registers each contain a word of information. In other words, the A and B registers are filled with a "data descriptor" and an "index value," respectively, as indicated in FIG. 18. After the stack has been adjusted with a data descriptor in the A register and an index value in the B register, the stack adjust controller (FIG. 7B) causes a control signal on the ADJC line of the control signal bus 400 causing the operator family controller X to go from state OC–X1 to state OC–X2.

During state OC–X2 the gating network 106 of the operator family controller X tests to see whether the word in the A register is a data descriptor. This is done by checking the tag bits of the word in the A register which identify the word. With reference to FIG. 5 it will be seen that the A[TAG] lines are part of the lines in the control signal bus 400 and are connected to the gating network 106 in the operator family controller X. The gating network 106 checks these lines to determine if a data descriptor is identified. If the word contained in the A register is a data descriptor the operator family controller X is to go on to state OC–X3. If for some reason an error has been made and the word in the A register was not a data descriptor, the gating network 106 would cause an error condition to be generated in the system. The operation for this error condition is not pertinent to an understanding of the present invention and is not described in detail herein.

During state OC–X3 the gating network 106 of the operator family control X checks the A[I] line in the control signal bus 400. It will be recalled that this is the line coupled to the index bit [I] of the word stored in the A register. If the index bit [I] is a 1, the data descriptor in the A register is already indexed and the operation of the operator family controller X for an INDEX operator can be terminated. The operation is terminated by going to state OC–X8 where the gating network 106 applies a control signal to the buffer 118 causing a control signal on the SECL bus 600. As indicated hereinabove, the control signal on the SECL bus causes the program sequence controller 300 to strobe the operator family controller X which is to receive and execute the next operator which is being applied to the operator code bus 500.

Return to state OC–X3 of the operator family controller X and assume that it has been found by the gating network 106 that the data descriptor stored in the A register is not indexed ($A[I] \neq 1$). This means that the index value contained in the B register must be inserted into the index value field of the data descriptor in the A register. To this end, the operator family controller X then goes into states OC–X4 and OC–X5.

Another test is made during state OC–X4 which is not pertinent to an understanding of the present invention. However, during state OC–X5 the gating network 106 checks the control signal bus lines B[EX] to determine if the value of the exponent in the B register is zero.

This test is quite important because if the exponent of the word in the B register is not zero, it means that the index value in the B register has not been integerized and, therefore, must be before it can be placed in the data descriptor in the A register. If the gating network 106 of the operator family controller X determines from the control signal bus lines B[EX] that the exponent is not zero, the operator family controller X goes into states OC–X9 through OC–X12. If on the other hand the gating network 106 determines from the control signal bus lines B[EX] that the exponent is zero, the index value in the B register is already integerized and operator family controller X goes on to states OC–X6 and OC–X7 where the index value is actually inserted into the data descriptor in the A register.

First, consider the operation of the operator family controller X for the case where the index value contained in the B register has already been integerized and the signals on the control signal bus B[EX] so indicate. The gating network 106 of the operator family controller X causes state OC–X6 to be entered where the index value contained in the B register is transferred into the index value field of the A register. To this end, the gating network 106 of the operator family controller X applies a control signal on the A[39:20]←B[19:20] on the line of the control signal bus 400. This in turn causes the gating and timing control circuit 218 in the top of stack register controller (FIG. 7A) to transfer the twenty bits containing the index value from the B register to the appropriate position in the A register. Accordingly, the data descriptor in the A register has now been indexed and contains the proper index value. The operator family controller X then goes to state OC–X7. During state OC–X7 the index bit (I) of the data descriptor contained in the A register is set to 1 to indicate that the data descriptor has been successfully indexed and the BRO flip-flop (FIG. 7B) is set to 0 to mark the B register as being empty. To this end, the gating network 106 of the operator family controller X applies a control signal to the A[I]←1 line and the BRO←0 line of the control signal bus 400. The timing, gating and control circuit 218 of the top of stack register controller (FIG. 7A) causes the index bit (I) in the A register to be set to 1 in response to the control signal at the A[I]←1 control signal bus. The control and timing unit 230 of the stack adjust controller causes the BRO flip-flop to be set to 0 in response to the control signal on the control signal bus line BRO←0.

Following state OC–X7 the operator family controller X automatically goes to state OC–X8 where execution of the index operator is terminated by applying a control signal on the SECL control signal bus as described hereinabove.

Return now to state OC–X5 and consider the operation of the operator family controller X under the conditions when the index value in the B register is not integerized and states OC–X9 through OC–X12 are entered. This operation is very important and should be noted carefully as it is one of the conditions under which an operator family controller is strobed into operation by another operator family controller X.

Under these conditions the gating network 106 detects the signals on the B[EX] line of the control signal bus 400 which indicates that the index value in the B register has not been integerized ($B[EX] \neq 0$) and cause the operator family controller X to go to state OC–X9.

During state OC–X9 the contents of the A and B registers are interchanged and the operator family controller B is called into operation to execute an INTEGERIZE operator. The reason that the contents of the A and B registers are interchanged is that the index value which is to be integerized is now contained in the B register, whereas the top of stack register controller only integerizes words in the A register. To this end, the gating network 106 of the operator family controller X applies control signals on the A←B and B←A lines of the control signal bus 400. This causes the timing, gating and control circuit 218 of the top of the stack register controller (FIG. 7A) to interchange the content of the A and B registers. The gating network 106 also applies a control signal to the buffer 113 causing a control signal on the INFL bus 700 (indicated in the flow diagram of FIG. 10 by the symbol INFL←1). Additionally, the gating network 106 applies control signals to the buffers 116 causing an INTEGERIZE code operator to be applied to the operator code bus 500. The gating network 106 also applies a control signal to the buffer 112B, causing a control signal on the family strobe bus B, and to the buffer 118, causing a control signal on the SECL bus 600.

The control signal on the INFL bus 700 causes the program sequence controller 300 to remove the operator code presently being applied to the operator code bus 500. To this end, the control signal applied to the INFL bus 700 precedes the other control signals generated during state OC–X9 by a slight amount so that by the time the INTEGERIZE operator is applied to the operator code bus 500, the program sequence controller 300 has removed its operator code. The control signals on the family strobe bus B and on the SECL bus 600 cause the operator family controller B to store the INTEGERIZE operator into its operator register and initiates its operation for execution of the INTEGERIZE operator. The operator family controller X then goes to state OC–X10 where it idles until the operator family controller B has completed execution of the INTEGERIZE operator.

The operation of the operator family controller B during execution of the INTEGERIZE operator is essentially identical to that described hereinabove in connection with the flow diagram of FIG. 8 and therefore will not be repeated at this point in the description.

Once state OC–X10 is entered, the operator family controller X removes the INTEGERIZE operator code from the code bus, the strobe signal from the family strobe bus B and the control signal from the SECL bus. However, the control signal formed on the INFL bus 700 continues throughout the integerize operation of the operator family controller B.

Finally, the operator family controller B completes execution of the INTEGERIZE operator and the index value is adjusted in the A register so that its exponent is zero. The operator family controller B applies a control signal at the SECL bus 600. This causes the operator family controller X to go from state OC–X10 to OC–X11.

During state OC–X11 the control signal on the INFL bus 700 is removed and the contents of the A and B registers are again interchanged to put the data descriptor and index value back in the A and B registers, respectively. To this end, the gating network 106 removes the control signal from the INFL bus 700 and applies control signals on the A←B and B←A lines of the control signal bus 400. The timing, gating and control circuit 218 in the top of stack register controller (FIG. 7A) then interchanges the content of the A and B registers. The operator family controller X now goes to state OC–X12.

During state OC–X12 a test is made to see if an overflow occurred during the integerize operation. As described in connection with the flow of FIG. 7, if an overflow did occur, the IOUF flip-flop is set to a 1 state causing a control signal on the IOU line of the control signal bus 400. Under these conditions the operator family controller X goes directly to the terminal state OC–X8 where the operator family controller X ends execution of the INDEX operator. If on the other hand an overflow did not occur, the IOUF flip-flop is in a 0 state and no control signal is applied at the IOUF line of the control signal bus. This causes the operator family controller X to go through states OC–X6 and OC–X7 where the integerized index value now contained in the B register is placed into the data descriptor in the A register and the index bit (I) is set to a 1 (to indicate that the data descriptor has been indexed). Following state OC–X7, the operator family controller X goes to its terminal state OC–X8 where the INDEX operation is terminated as discussed hereinabove.

With the structure of operator family controllers and their operation in mind, consider the operation of the program sequence controller 300. Consider first the program sequence controller 300 timing diagram shown in FIG. 16, together with the block diagram of the program seqeunce controller 300 shown in FIG. 6.

Each time a control singal is formed on the SECL bus 600, except when a control signal is also applied on the INFL bus 700, the control and timing unit 302 causes the PSR counter 306 to count up by one state. The PSR counter 306 is in state 0, syllable 0 is coupled to the output corresponding to the six syllables S0 through S5 contained in each word stored in the P register (FIG. 7A). The operator syllable network 304 couples the syllable correspond to the state of the PSR counter 306 from the P register to the output circuit 304a. Thus, when the PSR counter 306 is in state 0, syllable 0 is coupled to the output circuit 304a.

With reference to FIG. 16, it will be seen that at the time an operator code is being applied to the operator code bus 500 that the operator code for the preceding syllable is stored in the operator code register 102 of an operator family controller and is being executed.

Figure 11:
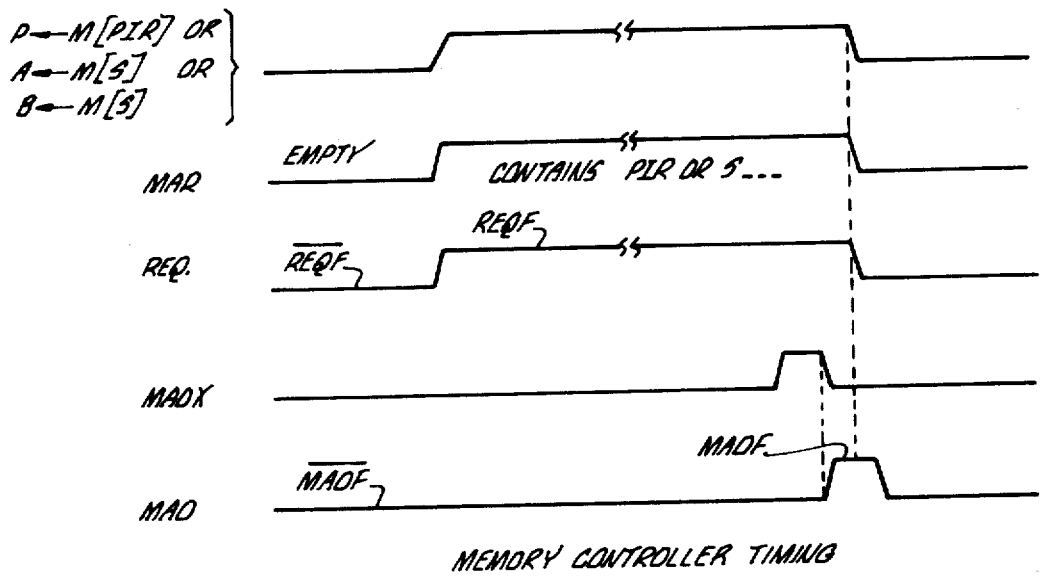
FIG. 11 is a flow diagram illustrating the sequence of operation of the program sequence controller.

With the general operation of the program sequence controller 300 in mind, consider in more detail the operation as illustrated by the flow diagram shown in FIG. 11. The program sequence controller 300 goes through a sequence of states under control of the control and timing unit 302. These states are referred to in FIG. 11 by the symbols PSC followed by a numeral corresponding to the states.

Initially the program sequence controller is in an idle condition referred to as PSC0. Whenever control signals are formed on the SECL bus 600 and on the output $\overline{INFL}$ or control signals are formed at the SECF output, the PROF output and on the INFL bus 700, the control and timing unit 302 causes the program sequence controller 300 to go from state PSC0 to state PSC1. The reason that the program seqeunce controller goes from state PSC0 to PSC1 whenever control signals are applied at SECL and INFL is that an operator family controller has completed its operation and the operator code currently on the operator family controller and a new operator syllable must be coupled from the P register. The program sequence controller goes from state PSC0 to PSC1 when control signals are formed at SECF, PROF and $\overline{INFL}$ to accomplish the same function. However, a control signal is formed at SECF when an operation complete signal has been formed on the SECL bus while the program sequence controller is busy. In other words, the SEC flip-flop is set to a 1 state and a control signal is formed at SECF to signal the program sequence controller that a request has been made for another operator which has not yet been provided. During state PSC1 the SEC flip-flop is set to 0 (SEC←0) if it had previously been set to a 1 state. Following state PSC1 the program sequence controller goes to state PSC2.

During state PSC2 a test is made by the control and timing unit 302 to see whether the PSR counter 306 has reached state 5. If it has reached state 5, then a new program word needs to be fetched from memory and stored into the P register because all six syllables of a program word have been used. To this end, states PSC4, PSC5 and PSC6 are entered. If, on the other hand, the PSR counter 306 has not reached state 5, state PSC3 is entered.

During state PSC3, the PSR counter 306 is counted up one state $(PSR \leftarrow PSR + 1)$ under control of the control and timing unit 302. Following state PSC3, the program sequence controller returns back to the idle condition state PSC0.

Refer back to state PSC2 and assume that the PSR counter 306 is found to be in state 5. The control and timing unit 302 causes the program seqeunce controller 300 to go to state PSC4 where the PSR counter 306 and the PRO flip-flop are set to zero. The PRO flip-flop is set to state 0 to indicate that each of the syllables in the P register in the top of stack register controller (FIG. 7A) have been executed and that the P register is effectively empty and in need of an additional program word. Following state PSC4, state PSC5 is entered.

During state PSC5 the control and timing unit 302 applies a control signal to the P←M[PIR] line of the control signal bus 400. This control signal causes the memory controller (FIG. 7C) to read out a new program word from the memory system 240 for storage into the P register 206. Once the new program word has been read out and stored in the P register a control signal is formed at the MAOF output of the MAO flip-flop (see FIG. 7C). This causes the control and timing unit 302 to take the program sequence controller 300 to state PSC6.

During state PSC6 the address contained in the PIR register of the storage device 242 is counted up by one unit. To this end, a control signal is applied on the $$P \leftarrow M[PIR]$$

line of the control signal bus 400 by the control and timing unit 302. Also, the control and timing unit 302 causes the PRO flip-flop to be set to a 1 state, indicating that the P register 206 now contains new program syllables which have not been executed. Following state PSC6, the program sequence controller returns to state PSC0 where it again idles until actuated into state PSC1.

Assume now during one of the states PSC1 through PSC6 one of the operator family controllers applies a control signal on the SECL bus 600. Referring to the upper righthand corner of the flow shown in FIG. 11, it will be noted that this causes the control and timing unit 302 to set the SEC flip-flop to a 1 state. This will then cause the program sequence controller flow to advance, after returning to state PSC0, to state PSC1 and thereby strobe the operator family controller corresponding to the next operator.

Refer now to the operation of the memory controller shown in FIG. 7C making reference to the flow diagram shown in FIG. 12. The memory controller also has states referred to herein by the symbols MC followed by a numeral corresponding to the various states of the memory controller. Initially, the memory controller is in an idle state, MC0. Whenever a control signal is formed on any one of the following lines of the control signal bus 400, the control and timing unit 252 causes the memory controller to go to state MC1:P←M[PIR], A←M[S], or B←M[S].

During state MC1 the control signal at the P←M[PIR] line of the control signal bus 400 causes the gate 248–PIR to cause the address contained in the PIR register to be read out and applied to the adder 246 and be stored unaltered in the MAR register 244. Similarly, if control signals are formed at either the A←M[S] or the B←M[S] control signal busses, the gate 248–S is activated causing the address in the S register to be read out through the adder and stored in the MAR register 244 unaltered. In addition, during state MC1 the OR gate 256 is responsive to a control signal on any one of the control signal bus lines P←M[PIR], A←M[S] and B←M[S] to set the REQ flip-flop to a 1 state, thereby indicating that a request to the memory is being requested.

The control signal formed at the REQF output (REQ flip-flop in a 1 state) causes the memory system 240 to read out the content of the memory location specified by the address in the MAR register 244. When the memory system 240 has completed its read operation and the selected word is being applied at the output 240b, a control signal is formed at the MAOX output. This causes the memory controller to go to state MC2 where the MAO flip-flop is set to a 1 state signaling that a memory read operation is complete. Following state MC2 the memory controller goes to state MC3 where the REQ and MAO flip-flops are reset to 0 states.

A similar flow could also be drawn for counting up the addresses in the PIR and S registers. However, the following description is felt to clearly cover this operation.

A control signal at the line PIR←PIR+1 causes the gate 248 to read out the address in the PIR register and causes the gate 254 to be activated, thereby causing the adder 246 to add one unit to the address. The control signal at the line P←PIR+1 also causes the OR gate 258 to activate one input to the gate 250–PIR and the control and timing unit 252 activates the other input with a strobe signal causing the incremented address from the adder 246 to be stored back into the PIR register. A similar operation takes place for the S register for a control signal at the $$S \leftarrow S + 1$$

line. A similar operation takes place for the S register in response to a control signal at the S←S−1 line except that the address is decreased (rather than increased) one unit.

Following state MC3 the memory controller returns to the idle state MC0.

FIG. 17 is a timing diagram illustrating the sequence of operation of the memory controller described with reference to the flow diagram of FIG. 12.

Consider the operation of the top of stack register controller shown in FIG. 7A making reference to the stack flow diagram of FIGS. 13 and 14. FIG. 13 shows the operation of the stack adjust controller flow for responding to a control signal at the ADJ (1, 2) line of the control signal bus 400. A control signal at the ADJ (1, 2) line indicates that the stack is to be adjusted so that the A register contains a word but so that the B register is either empty or contains a word. Similar to the other controllers, the various states of the stack adjust controller are represented by the symbols SAC followed by a numeral corresponding to the particular state involved.

Initially the timing and gating control circuit 218 of the stack register controller is in an idle condition referred to as state SAC0. A control signal at the ADJ (1, 2) line of the control signal bus causes the stack adjust controller to go to state SAC1.

During state SAC1 a test is made to see whether the A register contains a word or is empty. If the A register presently contains a word, the AR0 flip-flop is in a 1 state (AR0=1). If the AR0 flip-flop is in a 1 state, then the registers are in the required conditions and the control and timing unit 230 causes the stack adjust controller to go from state SAC1 to state SAC6. During state SAC6 a control signal is formed at the ADJC output by the control and timing unit 230. The control signal at the ADJC output of the control and timing unit 230 is applied to the ADJC line of the control signal bus 400 and is thereby coupled to the appropriate portions of the system. Following state SAC6 the stack adjust controller returns to the idle state SAC0.

Assume now that the stack adjust controller is back in state SAC1 and that the control and timing unit 230 detects that the AR0 flip-flop is in a 0 state (≠1). Under these conditions the A register is empty and accordingly must be filled by either moving a word from the B register to the A register (i.e. moving the content of the stack up) or by moving a word from the portion of the stack contained in memory up to the B register and then up to the A register. To this end, the control and timing unit 230 goes from state SAC1 to state SAC2 when the AR0 flip-flop is in a 0 state.

During state SAC2 a test is made to see whether the B register is full or empty. If the B register is full the BR0 flip-flop is in a 1-state (BR0=1) and the control and timing unit 230 causes the stack adjust controller to go to state 7.

During state 7 the word contained in the B register is moved up to the A register and the B register is marked empty by setting the BRO flip-flop to a 0 state. To this end, the control and timing unit 230 forms a control signal on the A←B line of the control signal bus 400 and resets the BRO flip-flop to a 0 state. The control signal on the A←B line of the control signal bus 400 causes the timing, gating and control circuit 218 of the top of stack register controller to transfer the content of the B register to the A register. Following state 7, the stack adjust controller enters state SAC5.

During state SAC5 the control and timing unit 230 sets the ARO flip-flop to a 1 state indicating that the A register is now full. Following state SAC5 state SAC6 is entered where the control signal is formed at the ADJC output as described hereinabove signaling the completion of the stack adjust operation.

Return now to state SAC2 of the stack adjust controller and assume that the BRO flip-flop was found to be 0, thereby indicating that the B register, as well as the A register, is empty. The 0 state of the BRO flip-flop causes the control and timing unit 230 to step the stack adjust controller from state SAC2 to state SAC3.

During state SAC3 the control and timing unit 230 forms a control signal at the A←M[S] line of the control signal bus 400. This in turn causes a control signal to the gates 248–S and 256 in the memory controller (FIG. 7C). The gate 248–S applies a control signal to the storage device 242 causing the content of the S register to be read out and applied to the adder 246. The address is stored unaltered in the MAR register 244. The gate 256 applies a control signal to the REQ flip-flop causing it to signal the memory system that a memory operation can be commenced using an address now stored in the MAR register 244. The memory system 240 goes through its memory cycle reading ont the content of the memory location specified by the address from the S register and when the information is read out from memory and applied to the output line 240b, a control signal is applied to the MAOX output causing the MAO flip-flop to be set to a 1 state. The 1 state of the MAO flip-flop causes the REQ flip-flop to be reset to a 0 state. The control signal formed at the MAOF output, during the 1 state of the MAO flip-flop, is applied to the control signal bus line MAOF causing the control and timing unit 230 to go from state SAC3 to state SAC4. Additionally, the MAO flip-flop is subsequently reset as described hereinabove.

During state SAC4 the control and timing unit 230 applies a control signal at the S←S+1 line of the control signal bus 400. This in turn is applied to the gates 248–S, 254 and 260 in the memory controller (FIG. 7C). The control signal is also applied to the control and timing unit 252. The gate 248–S again causes the word contained in the S register to be read out and applied to the input of the adder 246. The adder 246 adds one unit to the address read out of the S register and the result is applied back to the input of the storage device 242. The control and timing unit 252 subsequently applies a strobe signal to the input of the AND gate 250–S and the strobe signal in coincidence with the signal from the gate 260 causes the incremented address to be written back into the S register of the storage device 242. Following state SAC4, the stack adjust controller goes to states SAC5 and SAC6 which have been described above.

Consider now the operation of the stack adjust controller in response to a control signal at the ADJ (1, 1) line of the control signal bus 400. A control signal on the ADJ (1, 1) control signal bus requests that the stack adjust controller cause both the A and B registers to be filled with information, if they are not already filled. This is in contrast to the requirement for a control signal at the ADJ (1, 2) output wherein only the A register need be filled.

The flow diagram for the stack adjust controller in response to a control signal at the ADJ (1, 1) output is shown in FIG. 14. The flow block for states SAC0 and SAC6 are duplicated in FIG. 14 for convenience. However, a control signal on the ADJ (1, 1) control signal bus causes the stack adjust controller to go from state SAC0 to SAC11, whereas in FIG. 13 the controller went from state SAC0 to state SAC1.

During state SAC11 the control and timing unit 230 of the stack adjust controller determines if the A register is full or empty. If the A register is full, the ARO flip-flop is in a 1 state and the state adjust controller goes to state SAC19.

During state SAC19 the control and timing unit 230 determines if the B register is full. If the B register is full, the BRO flip-flop is in a 1 state ($BRO=1$) and the stack adjust controller goes directly to the terminal state SAC6. It will be recalled with reference to FIG. 13 that state SAC6 is the one wherein a control signal is applied on the ADJC line of the control signal bus signaling that the stack adjust operation is complete.

Returning now to state SAC11, assume that the control and timing unit 230 detected that the ARO flip-flop was not in a 1 state ($ARO \neq 1$). This will cause the control and timing unit of the stack adjust controller to go to state SAC12.

During state SAC12 the control and timing unit 230 determines if the B register is full. If the B register is full, the BRO flip-flop is in a 1 state ($BRO=1$) and the stack adjust controller goes to state SAC18.

During state SAC18 the content of the B register is transferred to the A register; this is equivalent to moving information up in the stack. To this end, the control and timing unit 230 applies a control signal to the A←B line of the control signal bus 400 causing the transfer to take place. Following state SAC18 the stack adjust controller goes to state SAC15.

During state SAC15 the control and timing unit 230 sets the ARO flip-flop to a 1 state (ARO←1). Following state SAC15 state SAC16 is entered.

During state SAC16 the B register is filled from the stack in memory. In other words, the stack is moved up one location. To this end, the control and timing unit 230 applies a control signal to the B←M[S] line of the control signal bus 400. As explained above, this causes the address contained in the S register to be used to address the memory system 240 and read out the corresponding word. The gate 208 causes the word to be stored into the A register 202 (FIG. 7A). After the word has been read out from memory and a control signal is formed at the MAOF output the stack adjust controller goes to state SAC17.

During state SAC17 the address contained in the S register must be decremented by one unit and the BRO flip-flop set to a 1 state to indicate that the B register is now full. To this end, the control and timing unit 230 sets the BRO flip-flop to a 1 state and applies a control signal at the S←S−1 line of the control signal bus 400. The control signal on the S←S−1 line of the control signal bus causes the address contained in the S register to be read out and decremented by one unit as described hereinabove.

Following state SAC17 the stack adjust controller goes to the terminal state SAC6 where a control signal is formed at the ADJC line of the control signal bus.

Return now to state SAC12 of the stack adjust controller and assume that it was found that the B register as well as the A register is empty, hence, both the A and B registers need words from memory. The 0 state of the BRO flip-flop causes the stack adjust controller to go from state SAC12 to state SAC13.

During state SAC13 the control and timing unit 230 applies a control signal at the A←M[S] line of the control signal bus 400. This control signal causes the address contained in the S register to be used to address the memory system 240 and read out the content of the corresponding memory location similar to that described above. When the memory has been read out the word is stored into the A register. A control signal is then formed at the MAOF output causing the stack adjust controller to go from state SAC13 to state SAC14.

During state SAC14 the S register must be decremented by one unit similar to that described in connection with state SAC17. To this end, the control and timing unit 230 applies a control signal at the $S \leftarrow S - 1$ output causing the address to be decremented by one unit and restored into the S register.

Following state SAC14 the stack adjust controller goes through states SAC15 through SAC17 where the ARO flip-flop is set to a 1 state to indicate that the A register is now full, to read up a word from memory into the B register, and to appropriately set the BRO flip-flop to a 1 state and decrease the address in the S register down by one unit.

The terminal state SAC6 is then entered and a control signal is formed at the ADJC output, so indicating. Following state SAC6 the idle state SAC0 is again entered.

It should be noted that the J counters for each operator family controller may, all or in part, be a combination of flip-flops used for other purposes in the system and that the states attributed thereto may merely be the combination of states of the flip-flops.

It will also be recognized that, within the scope of the broader aspects of the present invention, the operator register need not necessarily be placed in each operator family controller but that a single operator register might be placed in the program sequence controller with an output coupled to each opeator family controller. Additionally, within these broader aspects of the invention the operator code need not necessarily be stored directly in an operator register but a representative signal may be stored instead.

It is to be understood that the above-described arrangements are illustrative of the principles of this invention. Numerous other arrangements may be devised by those skilled in the art without departing from the spirit and scope of this invention.

What is claimed is:

1. A data processor comprising a plurality of operator family controllers each responsive to a different family of program operators for forming control signals indicative of data manipulations, means for manipulating data responsive to said control signals from any one of the operator family controllers, and means for controlling and coordinating the operation of said operator family controllers.

2. A data processor as defined in claim 1 wherein each of said operator family controllers comprises an operator decoder having output signal lines and a sequence decoder having output signal lines and a gating network for combining the output signal lines from both said sequence decoder and said operator decoder to form said control signals.

3. A data processor as defined in claim 1 wherein each of said operator family controllers comprises an operator storage register having an output circuit and an operator decoder coupled to the output circuit of the operator storage register.

4. A data processor as defined in claim 2 wherein each of said operator family controllers comprises an individual sequence counter having an output circuit coupled to the sequence decoder and operative for causing a sequence of control signals from the sequence decoder in accordance with the operation of the corresponding operator family controller.

5. A data processor as defined in claim 2 wherein the gating network of each operator family controller has a separate control signal output circuit and the manipulating means has a separate control signal input circuit for each different type of data manipulation to be initiated by the operator family controllers and a plurality of busses, one for each different type of data manipulation to be initiated by the operator family controllers, each of said busses being connected to the corresponding output circuit of each operator family controller and to the corresponding input circuit of the manipulating means for the corresponding type of data manipulation.

6. A data processor as defined in claim 1 wherein each of said operator family controllers comprises means for initiating the operation of another operator family controller to form control signals causing manipulation of data in the data manipulation means.

7. A data processor as defined in claim 6 wherein each operator family controller comprises means for applying a coded signal to the operator family controller which is initiated designating the data manipulation to be caused by such operator family controller.

8. A data processing system as defined in claim 1 wherein said means for coordinating comprises means for applying coded program signals to the operator family controllers for controlling the operation thereof.

9. A data processing system as defined in claim 1 wherein said data manipulating means comprises a plurality of registers and means for manipulating data therein in response to said control signals.

10. A data processing system as defined in claim 1 wherein said data manipulating means comprises a memory system operative for reading and writing therein in response to said control signals.

11. A data processor comprising a plurality of individually physically separate operator family controllers each responsive to a different family of program operators and each for forming control signals predetermined by a program operator, a physically separate functional resource apparatus for manipulating data responsive to control signals from any one of the family controllers and means for coordinating and controlling the operation of said family controllers.

12. A data processor comprising a backplane mounting panel having a plurality of modules each module containing an operator family controller including an operator register, an operator register decoder, a sequence counting means and a sequence counting means decoder, said decoders having a plurality of output signal lines and a gating network for combining the signal lines from said decoders and having a separate output control signal line for each different function to be initiated thereby, the operator family controllers each having said control signal lines each of which signals the same function as do corresponding control signal lines in other operator family controllers, and a transmission line bus for each different function to be initiated by the operator family controllers extending to each operator family controller and including a connection to the corresponding control signal line from each operator family controller so that a control signal from any controller signaling a particular function will appear on the corresponding transmission bus.

13. A data processor comprising a plurality of operator family controllers each associated with a different family of operators and each including control and timing circuitry for forming control signals predetermined by one of the associated family of operators received thereby, a common functional resources apparatus for manipulating data responsive to control signals provided by any one of the operator family controllers and a program controller for selectively providing a series of operators for execution by the operator family controller associated with each operator.

14. A data processor as defined in claim 12 wherein said program controller comprises means for providing a strobe signal for each operator to the operator family controller which is to receive the operator thereby initiating the operation of the corresponding operator family controller.

15. A data processor as defined in claim 13 including family strobe busses coupled to output circuits of the program controllers, one bus being provided corresponding to each operator family controller, each bus being connected to an input circuit of the corresponding operator family controller for initiating the operation thereof in response to a strobe signal thereon, the program controller being operative for applying a strobe signal to the family strobe bus corresponding to the family controller whose operation is to be initiated.

16. A data processor executing the operations specified by a plurality of program operators at least one of which in part requires the same sequence of operation as those required by another program operator, the combination comprising a plurality of operator family controllers each associated with different program operators and each including control and timing circuitry for forming control signals predetermined by one of the associated program operators received thereby, and a program controller for providing a series of program operators for execution by the operator family controller associated with each program operator, at least one of said operator family controllers including means for providing an operator to another operator family controller for execution.

17. A data processor as defined in claim 16 wherein each operator family controller has a strobe input coupled for receiving a strobe signal from the program controller for initiating operation indicated by a program operator.

18. A data processor as defined in claim 17 wherein said strobe input for each operator family controller is coupled to other operator family controllers for receiving strobe signals from other operator family controllers causing operation indicated by a program operator provided by another operator family controller.

19. A data processor as defined in claim 18 wherein each operator family controller comprises an operator storage register and means for storing a program operator from the program controller or an operator family controller into the operator register in response to a strobe signal at the strobe input.

20. A data processor as defined in claim 17 including operator code busses coupled to the program controller and to the operator family controllers for sending operators therebetween, a strobe signal at a strobe input causing the corresponding operator family controller to receive and cause execution of an operator applied on the operator bus.

21. A data processor as defined in claim 20 wherein each operator family controller comprises means for applying an inhibit signal to the program controller when the operator family controller is to provide an operator on the operator code busses to another operator family controller, the program controller being responsive to the inhibit signal for momentarily not applying a new operator for execution to the operator code busses and thereby allow an operator to be sent between operator family controllers.

22. A data processor comprising a plurality of operator family controllers each being associated with different operators to be executed and having an operator register and control and timing circuitry which is operative for providing one or more control signals for sequencing an operation predetermined by an operator contained in the corresponding operator register, a common functional resource apparatus having control circuits coupled to each of said operator family controllers and including registers and gating for manipulating data in the registers under control of control signals from any one of said operator controllers, and a program sequence controller including means for applying the next operator in sequence to be executed to each of said operator controllers, the associated operator controller being operative for storing such operator in the operator register thereof for execution.

23. A data processor comprising a stack storage apparatus operative for storing and reading information on a first in, last out, basis in response to control signals, a plurality of operator family controllers each responsive to a different family of program operators for applying control signals to the stack storage apparatus for controlling the operation thereof and means for controlling and coordinating the operation of said operator family controllers.

24. A data processor comprising a plurality of operator family controllers each for forming control signals predetermined by a different family of program operators and for forming an operation complete signal upon completing the execution of each operator, a program controller for providing a new program operator to said operator family controllers in response to said operation complete signal, and means for manipulating data in response to control signals from any one of said operator family controllers.

25. A data processor as defined in claim 24 wherein each operator family controller is operative for initiating operation of another operator family controller and for applying an operator code to the initiated operator family controllers designating a sequence of control signals to be performed thereby.

26. A data processor as defined in claim 25 including a common operator code bus coupled to said program controller and operator family controllers for sending the operators therebetween.

27. A data processor as defined in claim 26 wherein each operator family controller is operative to apply an inhibit signal to the program controller when initiating operation of another operator family controller, the program family controller being operative for normally applying the next operator to be executed to the operator code bus and responsive to an inhibit signal for removing the next operator and additionally responsive to an inhibit signal for ignoring the operation complete signal formed by the initiated operator family controller so as not to provide another operator for execution until the operation of the initiating family controller is complete.

28. A data processor comprising a source for supplying a plurality of distinct program operators each of which is a member of one of a plurality of families of related program operators; a controller for each family of related program operators, each controller responding to any of the family of related program operators for forming control signals indicative of data manipulations; means for distributing each program operator produced by the source to the controller corresponding to the family of which the program operator is a member; and means for manipulating data responsive to control signals from any one of the controllers.

29. In a data processor for executing a plurality of program operators at least one of which in part requires the same operating sequence which is required by another program operator, the combination comprising a program controller for supplying a series of program operators; controllable means for manipulating data; and a plurality of controllers coupled to the program controller, each accepting different program operators therefrom and each for controlling the data manipulation means in a manner predetermined by an accepted program operator, at least one of the controllers including means operative before the completion of the execution of an accepted program operator for temporarily transferring control of the data manipulation means to another controller and means for resuming control upon the completion by the other controller of the controlling of a part of the operating sequence required by the accepted program operator.

References Cited

UNITED STATES PATENTS

| | | |
|---|---|---|
| 3,351,918 | 11/1967 | Levy. |
| 3,274,561 | 9/1966 | Hallman et al. ____ 340—172.5 |
| 3,287,702 | 11/1966 | Borck, Jr., et al. ____ 340—172.5 |
| 3,302,182 | 1/1967 | Lynch et al. _____ 340—172.5 |

GARETH D. SHAW, Primary Examiner

PO-1050
(5/69)

UNITED STATES PATENT OFFICE
CERTIFICATE OF CORRECTION

Patent No. 3,566,364      Dated February 23, 1971

Inventor(s) Erwin A. Hauck

It is certified that error appears in the above-identified patent and that said Letters Patent are hereby corrected as shown below:

Column 3, lines 7 and 8, "data processor comprises a plurality of operator family controller." should be --of related operators are executed by each operator family controller.--

Column 5, line 6, after "The operator" add --code--

Column 7, line 46, after "#" add --1--

Column 8, line 75, change "Z" to --B--

Column 9, line 63, change "as" to --has--

Column 10, line 44, change "stock" to --stack--

Column 15, line 72, change "stroke" to --strobe--

Column 18, line 9, "[38:36] should be --A[38:36]--

Column 22, line 9, "seqeunce" should be --sequence--

"    "    line 14, after "counter" insert --has six states referred to as states 0 through 5,--

"    "    line 14, delete "306 is in state 0, syllable 0 is coupled to the out-"

"    "    line 18, change "correspond" to --corresponding--

"    "    line 42, "seqeunce" should be --sequence--

Column 23, line 2, "seqeunce" should be --sequence--

"    "    line 32, after "now" insert --that--

Column 25, line 3, "on" should be --at--

PO-1050
(5/69)

UNITED STATES PATENT OFFICE
CERTIFICATE OF CORRECTION

Patent No. 3,566,364          Dated February 23, 1971

Inventor(s) Erwin A. Hauck

It is certified that error appears in the above-identified patent and that said Letters Patent are hereby corrected as shown below:

Column 25, line 34, "ont" should be --out--

Column 26, line 9, "state", second occurrence, should be -- stack --.

Column 27, line 30, "opeator" should be --operator--

Signed and sealed this 14th day of March 1972.

(SEAL)
Attest:

EDWARD M. FLETCHER, JR.          ROBERT GOTTSCHALK
Attesting Officer          Commissioner of Patents